United States Patent
Fukayama et al.

(10) Patent No.: US 10,296,560 B2
(45) Date of Patent: May 21, 2019

(54) INFORMATION PROCESSING DEVICE, INFORMATION PROCESSING METHOD, AND PROGRAM FOR CHANGING A NUMBER OF PAGES OF CONTENTS TO BE DISPLAYED

(71) Applicant: LINFINY CORPORATION, Taoyuan (TW)

(72) Inventors: Kazuteru Fukayama, Kanagawa (JP); Shingo Utsuki, Kanagawa (JP); Fumiaki Tamehiro, Kanagawa (JP)

(73) Assignee: LIFINY CORPORATION, Taoyuan (TW)

( * ) Notice: Subject to any disclaimer, the term of this patent is extended or adjusted under 35 U.S.C. 154(b) by 90 days.

(21) Appl. No.: 14/527,905

(22) Filed: Oct. 30, 2014

(65) Prior Publication Data
US 2015/0154153 A1  Jun. 4, 2015

(30) Foreign Application Priority Data
Dec. 2, 2013 (JP) ................. 2013-249366

(51) Int. Cl.
G06F 17/00 (2006.01)
G06F 17/21 (2006.01)
G06F 3/0483 (2013.01)
G06F 3/0485 (2013.01)
G06F 3/0488 (2013.01)

(52) U.S. Cl.
CPC .......... *G06F 17/217* (2013.01); *G06F 3/0483* (2013.01); *G06F 3/0485* (2013.01); *G06F 3/04855* (2013.01); *G06F 3/04883* (2013.01)

(58) Field of Classification Search
CPC ...................................... G06F 17/21
See application file for complete search history.

(56) References Cited

U.S. PATENT DOCUMENTS

| | | | |
|---|---|---|---|
| 2002/0054052 A1* | 5/2002 | Sharma | G06F 17/30905 715/700 |
| 2005/0210403 A1* | 9/2005 | Satanek | G06F 3/04855 715/786 |

(Continued)

FOREIGN PATENT DOCUMENTS

| | | |
|---|---|---|
| JP | 2005-056042 | 3/2005 |
| JP | 2008-269448 A | 11/2008 |

(Continued)

OTHER PUBLICATIONS

Samsung I9300 Galaxy S III—Full phone specifications, retrieved on Mar. 25, 2015, pp. 1-3, http://web.archive.org/web/20130115080043:/http://www.gsmarena.com/samsung_i9300_galaxy_s_iii-4238.php.

(Continued)

*Primary Examiner* — Mustafa A Amin
(74) *Attorney, Agent, or Firm* — Paratus Law Group, PLLC

(57) ABSTRACT

There is provided an information processing device including a page feed unit configured to continuously feed pages in contents including a plurality of pages, and a display control unit configured to change the number of the pages to be displayed on a display screen according to an operation by a user when the pages are fed by the page feed unit.

11 Claims, 21 Drawing Sheets

(56) References Cited

U.S. PATENT DOCUMENTS

| | | | | |
|---|---|---|---|---|
| 2008/0309626 | A1* | 12/2008 | Westerman | G06F 3/0485 345/173 |
| 2009/0307622 | A1* | 12/2009 | Jalon | G06F 17/30265 715/765 |
| 2010/0056221 | A1 | 3/2010 | Park | |
| 2010/0265194 | A1* | 10/2010 | Liu | G06F 3/04883 345/173 |
| 2010/0277496 | A1* | 11/2010 | Kawanishi | G06F 3/0485 345/589 |
| 2010/0298034 | A1* | 11/2010 | Shin | G06F 3/04883 455/566 |
| 2011/0055753 | A1* | 3/2011 | Horodezky | G06F 3/04883 715/810 |
| 2011/0113363 | A1* | 5/2011 | Hunt | G06F 3/0481 715/800 |
| 2011/0157046 | A1* | 6/2011 | Lee | G04G 21/08 345/173 |
| 2012/0062604 | A1* | 3/2012 | Lobo | G06F 3/0485 345/684 |
| 2012/0206498 | A1* | 8/2012 | Kai | G06F 3/0482 345/684 |
| 2013/0127727 | A1 | 5/2013 | Allen | |
| 2013/0176298 | A1* | 7/2013 | Lee | G06F 3/0488 345/419 |
| 2014/0053102 | A1* | 2/2014 | Lee | G06F 3/0482 715/810 |
| 2014/0075286 | A1* | 3/2014 | Harada | G06F 3/04886 715/234 |

FOREIGN PATENT DOCUMENTS

| | | |
|---|---|---|
| JP | 2010-033228 A | 2/2010 |
| JP | 2012-221073 A | 11/2012 |
| JP | 2013-003718 A | 1/2013 |

OTHER PUBLICATIONS

Adobe Systems Incorporated, Acrobat Help/Release Notes/Acrobat, Reader, retrieved on Mar. 25, 2015, pp. 1-8, https://helpx.adobe.com/acrobat/release-note/release-notes-acrobat-reader.html.

Adobe Systems Incorporated, Adobe Acrobat XI—Help and tutorials, Sep. 30, 2013, pp. i-52.

Adobe Reader XI—screen capture, screenshot, pp. 1-6, retrieved on Mar. 25, 2015.

Apr. 7, 2015, European Search Report issued for related EP application No. 14194436.3, pp. 1-12.

Nov. 29, 2016, Japanese Office Action issued for related JP application No. 2013-249366, pp. 1-2.

Samsung Galaxy SIII i9300—Gallery—screen capture, screenshot, retrieved on Mar. 25, 2015, pp. 1-7.

* cited by examiner

INFORMATION PROCESSING DEVICE, INFORMATION PROCESSING METHOD, AND PROGRAM FOR CHANGING A NUMBER OF PAGES OF CONTENTS TO BE DISPLAYED

CROSS REFERENCE TO RELATED APPLICATIONS

This application claims the benefit of Japanese Priority Patent Application JP 2013-249366 filed Dec. 2, 2013, the entire contents of which are incorporated herein by reference.

BACKGROUND

The present disclosure relates to an information processing device, an information processing method, and a program.

In recent years, an electronic book which allows a user to browse document data including a large amount of pages like a paper book has been developed. In the electronic book, a user can switch a page displayed on a display screen by performing a touch operation such as a flick to the display screen of the electronic book for instance.

For instance, JP 2005-56042A discloses a technology of feeding pages by the predetermined number of pages each when a feed button is operated by a user.

SUMMARY

However, in the above-described technology, convenience is low in a scene where the user confirms contents of continuous pages. For instance, in the technology, the number of pages when feeding pages is fixed. Therefore, when the user feels that the number of pages as a unit of page teed is large, the user feels difficulty in page confirmation. Also, when the user feels that the number of pages as a unit of page feed is small, the user feels page confirmation boring.

Accordingly, the present disclosure proposes a new and improved information processing device, information processing method, and program capable of improving convenience in a scene where a user confirms contents of continuous pages.

Accordingly, according to an embodiment of the present disclosure, there is provided an information processing device including a page feed unit configured to continuously feed pages in contents including a plurality of pages, and a display control unit configured to change the number of the pages to be displayed on a display screen according to an operation by a user when the pages are fed by the page feed unit.

Further, according to another embodiment of the present disclosure, there is provided an information processing method including continuously feeding pages in contents including a plurality of pages, and changing the number of the pages to be displayed on a display screen by a processor according to an operation by a user when the pages are fed.

Further, according to another embodiment of the present disclosure, there is provided a program for causing a computer to function as a page feed unit configured to continuously feed pages in contents including the plurality of pages, and a display control unit configured to change the number of the pages to be displayed on a display screen according to an operation by a user when the pages are fed by the page feed unit.

As described above, according to the present disclosure, it is possible to improve the convenience in the scene where the user confirms the contents of the continuous pages. An effect described here is not necessarily limited and may be one of effects described in the present disclosure.

DETAILED DESCRIPTION OF THE EMBODIMENT(S)

Figure 1:
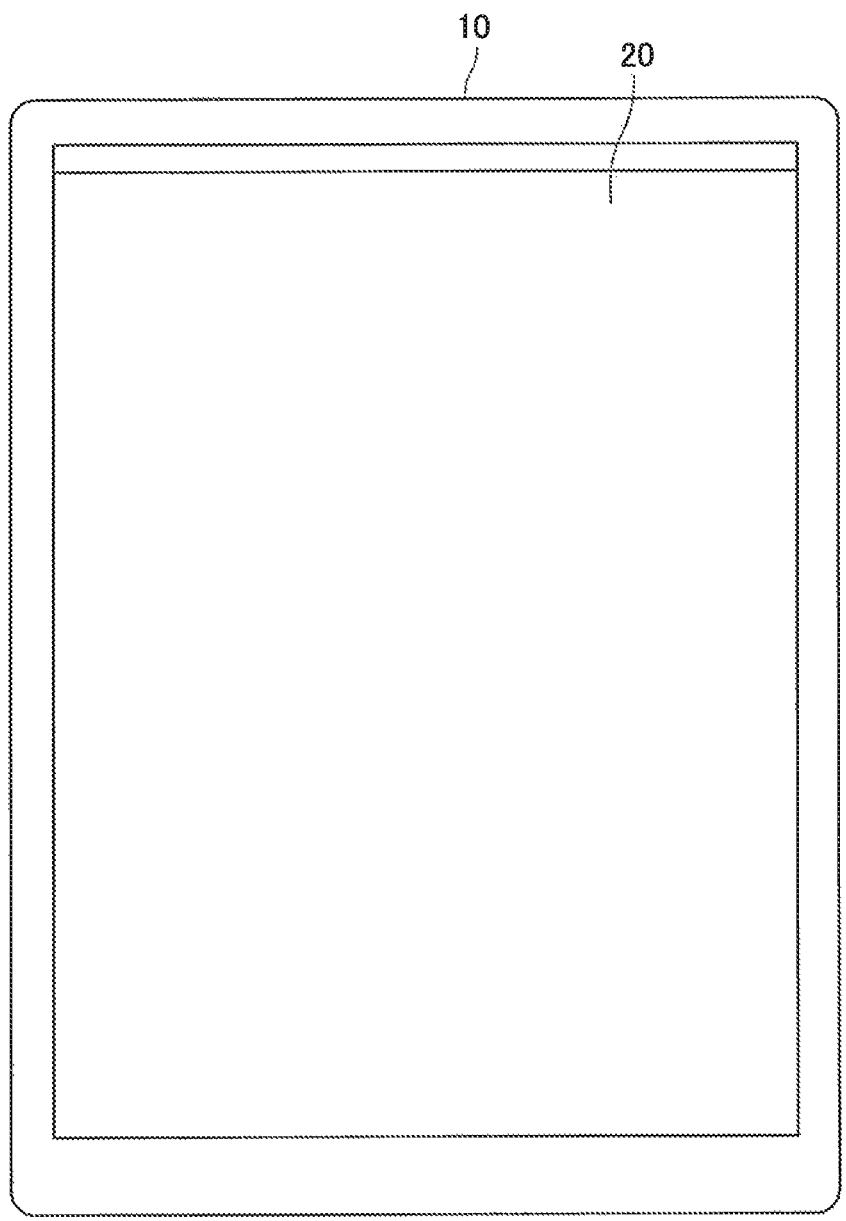
FIG. 1 is an explanatory diagram illustrating a basic configuration of electronic paper 10 according to the present embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The "detailed description of the embodiment" will be described according to the item order indicated below.

1. Background
2. Basic configuration
3. Detailed description of embodiment
3-1. Configuration
3-2. Operation
3-3. Effect
4. Modification <<1. Background>>

The present disclosure can be implemented in various forms as described in detail in "3. Detailed description of embodiment" as one example. First, in order to clearly indicate features of the present disclosure, a background of creating an information processing device according to an embodiment of the present disclosure will be described.

In recent years, various kinds of devices or software for browsing content data with presence of a concept of pages like paper data have been developed. A user can browse a large amount of pages recorded in one piece of content data through such a device or software.

In the past, as such a technology of browsing content data, three kinds of technologies below have been proposed. First, the technology of allowing the user to feed pages by a flick operation or the like for instance has been proposed. However, in this technology, since the operation of feeding pages has to be repeated many times when the user confirms a large amount of pages, the user feels fatigue and a long period of time may be necessary.

Secondly, the technology of displaying pages while continuously feeding pages has been proposed. However, in this technology, pages can be fed at a fixed speed at all times, and it is difficult for the user to adjust it to an easy-to-browse speed. Therefore, for instance, when the user feels that the speed of feeding pages is too fast, the user feels difficulty in page confirmation. Alternatively, when the user feels that the speed of feeding pages is too slow, the user feels page confirmation boring and it takes time more than necessary.

Thirdly, the technology of changing a display page by the user operating a slide bar displayed on a display screen has been proposed. However, in this technology, since pages are displayed on the display screen without order, there is a problem that it is difficult for the user to confirm contents of the plurality of pages present between the pages before and after change.

Therefore, the information processing device according to an embodiment of the present disclosure is created paying attention to the above-described circumstances. The information processing device according to an embodiment of the present disclosure is capable of improving convenience in a scene where the user confirms the contents of continuous pages.

<<2. Basic Configuration>>

Next, a basic configuration of the information processing device according to an embodiment of the present disclosure will be described with reference to FIG. 1. Electronic paper 10 illustrated in FIG. 1 is one example of the information processing device according to an embodiment of the present disclosure. As illustrated in FIG. 1, the electronic paper 10 is a portable device including a display for displaying a display screen 20.

The electronic paper 10 is capable of making the display screen 20 display an arbitrary page from content data including a plurality of pages, stored in a storage device 172 to be described later, according to an operation by a user for instance.

<2-1. Configuration of Cross Section>

Figure 2:
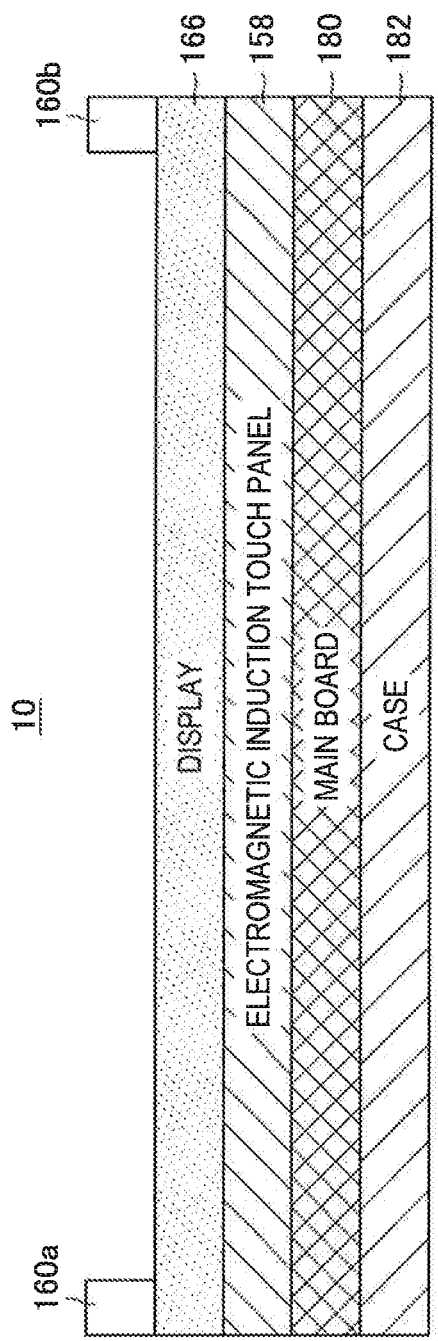
FIG. 2 is an explanatory diagram illustrating a sectional view of the electronic paper 10 according to the embodiment.

Here, with reference to FIG. 2, a configuration of a cross section of the electronic paper 10 will be described. FIG. 2 is an explanatory diagram illustrating the cross section of the electronic paper 10 in a vertical direction or a horizontal direction in FIG. 1. As illustrated in FIG. 2, the electronic paper 10 is configured by laminating a case 182, a main board 180, an electromagnetic induction touch panel 158, a display 166, and a touch detector 160 in order from a bottom surface.

[2-1-1. Touch Detector 160]

The touch detector 160 is configured like an outer peripheral frame surrounding the display 166 in the information processing device. The touch detector 160 can detect a position of a finger of the user for instance arranged on a surface of the display 166 by emitting infrared rays for instance between upper and lower or left and right ends.

[2-1-2. Electromagnetic Induction Touch Panel 158]

Also, the electromagnetic induction touch panel 158 is a panel capable of detecting a position where a pen nib of an exclusive pen that generates a magnetic field for instance is brought into contact with the display 166. For instance, the electromagnetic induction touch panel 158 can detect the position where the exclusive pen is brought into contact with the display 166 by receiving electromagnetic energy from the exclusive pen.

[2-1-3. Display 166]

Also, the display 166 is a display device constituted of an electrophoretic display (EPD) for instance. The display 166 realizes some functions of a display unit 110 to be described later.

<2-2. Hardware Configuration>

Figure 3:
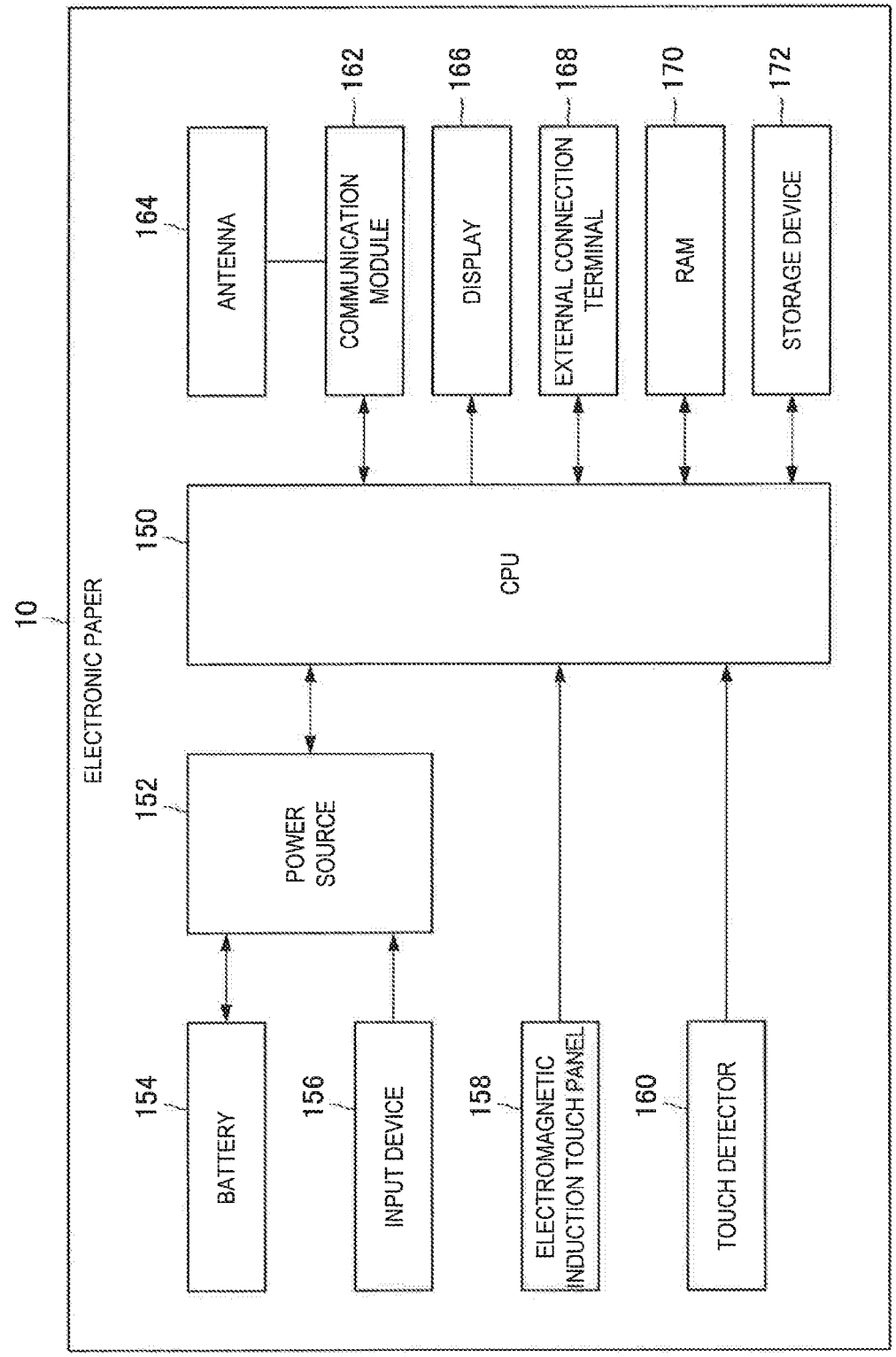
FIG. 3 is an explanatory diagram illustrating a hardware configuration of the electronic paper 10 according to the embodiment.

Also, the electronic paper 10 has a hardware configuration as illustrated in FIG. 3 for instance. As illustrated in HG. 3, the electronic paper 10 includes a CPU 150, a power source 152, a battery 154, an input device 156, the electromagnetic induction touch panel 158, the touch detector 160, a communication module 162, an antenna 164, the display 166, an external connection terminal 168, a RAM 170, and the storage device 172. Since the electromagnetic induction touch panel 158, the touch detector 160, and the display 166 are described in the paragraph 2-1, the description is omitted here.

[2-2-1. CPU 150]

The CPU 150 is constituted of a processor such as a microprocessor. The CPU 150 functions as an arithmetic processing unit and a controller, and controls overall operations inside the electronic paper 10 according to various kinds of programs. For instance, the CPU 150 realizes a function of a control unit 100 in the electronic paper 10.

[2-2-2. Power Source 152]

The power source 152 is a device for supplying power necessary for the CPU 150 to perform arithmetic operations or control, for instance. The power source 152 includes, for instance, a power circuit that changes a voltage of input power and generates output power, and the like.

[2-2-3. Battery 154]

The battery 154 is a battery capable of storing electricity by being charged. The battery 154 is constituted of a lithium ion secondary battery for instance.

[2-2-4. Input Device 156]

The input device 156 is constituted of input means such as a button and a switch, for instance, for having a user input information, an input control circuit that generates input signals on the basis of the input by the user, and the like.

[2-2-5. Communication Module 162]

The communication module 162 is constituted of a communication device for being connected to a communication network such as the Internet for instance or the like. For instance, the communication module 162 includes a communication device adaptive to a wireless LAN or a communication device adaptive to long term evolution (LTE), or the like.

[2-2-6. Antenna 164]

The antenna 164 receives electromagnetic waves in space, and converts the received electromagnetic waves to electric signals. Also, the antenna 164 converts the electric signals generated by the communication module 162 to the electromagnetic waves, and emits them into the space.

[2-2-7. External Connection Terminal 168]

The external connection terminal 168 is a terminal installed to connect the electronic paper 10 with another device. For instance, the external connection terminal 168 includes a universal serial bus (USB) terminal to be connected to a USB cable or the like.

[2-2-8. Ram 170]

The RAM 170 temporarily stores the program to be used in execution of the CPU 150, a parameter to be appropriately changed in the execution, and the like.

[2-2-9. Storage Device 172]

The storage device 172 is a device for storing data that functions as a storage unit 112 to be described later for instance. The storage device 172 includes, for instance, a storage medium, a recorder that records the data in the storage medium, a reader that reads the data from the storage medium or a deletion device that deletes the data recorded in the storage medium, and the like.

The hardware configuration of the electronic paper 10 is not limited to the above-described configuration. For instance, the electronic paper 10 may not include one or more of the communication module 162, the antenna 164, and the external connection terminal 168.

<<3. Detailed Description of Embodiment>>

The basic configuration of the electronic paper 10 according to the present embodiment has been described above. Subsequently, a configuration of the electronic paper 10 according to the present embodiment will be described in detail.

<3-1. Configuration>

Figure 4:
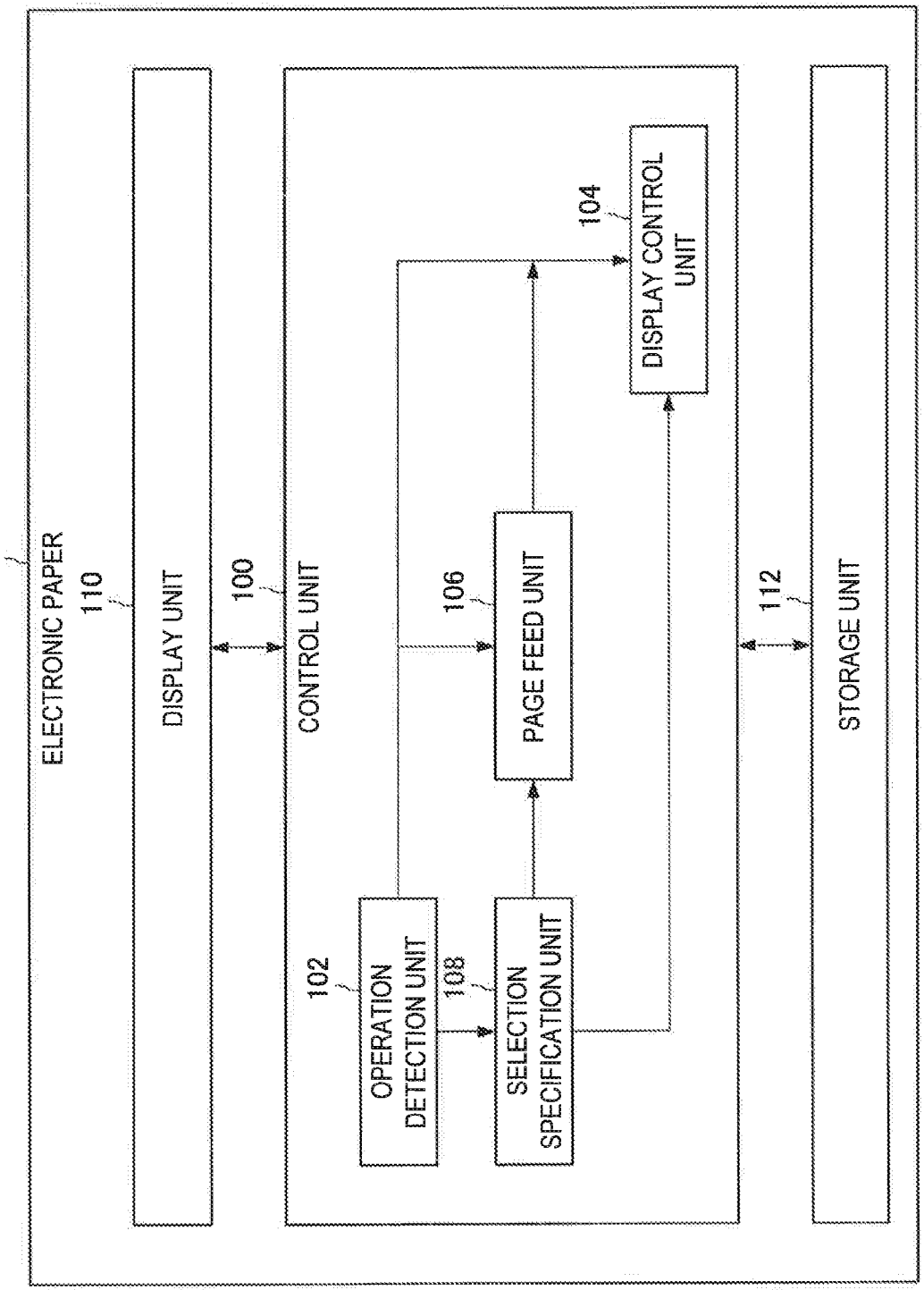
FIG. 4 is a functional block diagram illustrating a configuration of the electronic paper 10 according to the embodiment.

FIG. 4 is a functional block diagram illustrating the configuration of the electronic paper 10 according to the present embodiment. As illustrated in FIG. 4, the electronic paper 10 includes the control unit 100, the display unit 110, and the storage unit 112.

[3-1-1. Control Unit 100]

The control unit 100 generally controls the operation of the electronic paper 10 using hardware such as the CPU 150 and the RAM 170 and the like incorporated in the electronic paper 10. Also, as illustrated in FIG. 4, the control unit 100 includes an operation detection unit 102, a display control unit 104, a page feed unit 106, and a selection specification unit 108.

[3-1-2. Operation Detection Unit 102]

The operation detection unit 102 detects an operation by a finger of the user to the display screen 20. For instance, the operation detection unit 102 detects a touch operation that is an operation that the user touches an arbitrary position on the display screen 20 with the finger. Also, the operation detection unit 102 detects a sliding operation that is an operation that the user slides the finger in the state that the finger is in contact with the display screen 20. Also, the operation detection unit 102 detects a holding operation that is an operation that the user makes the finger stand still for a predetermined time or longer in the state that the finger is in contact at the arbitrary position with the display screen 20.

[3-1-]. Display Control Unit 104]

(3-1-3-1. Control Example 1)

Figure 5:
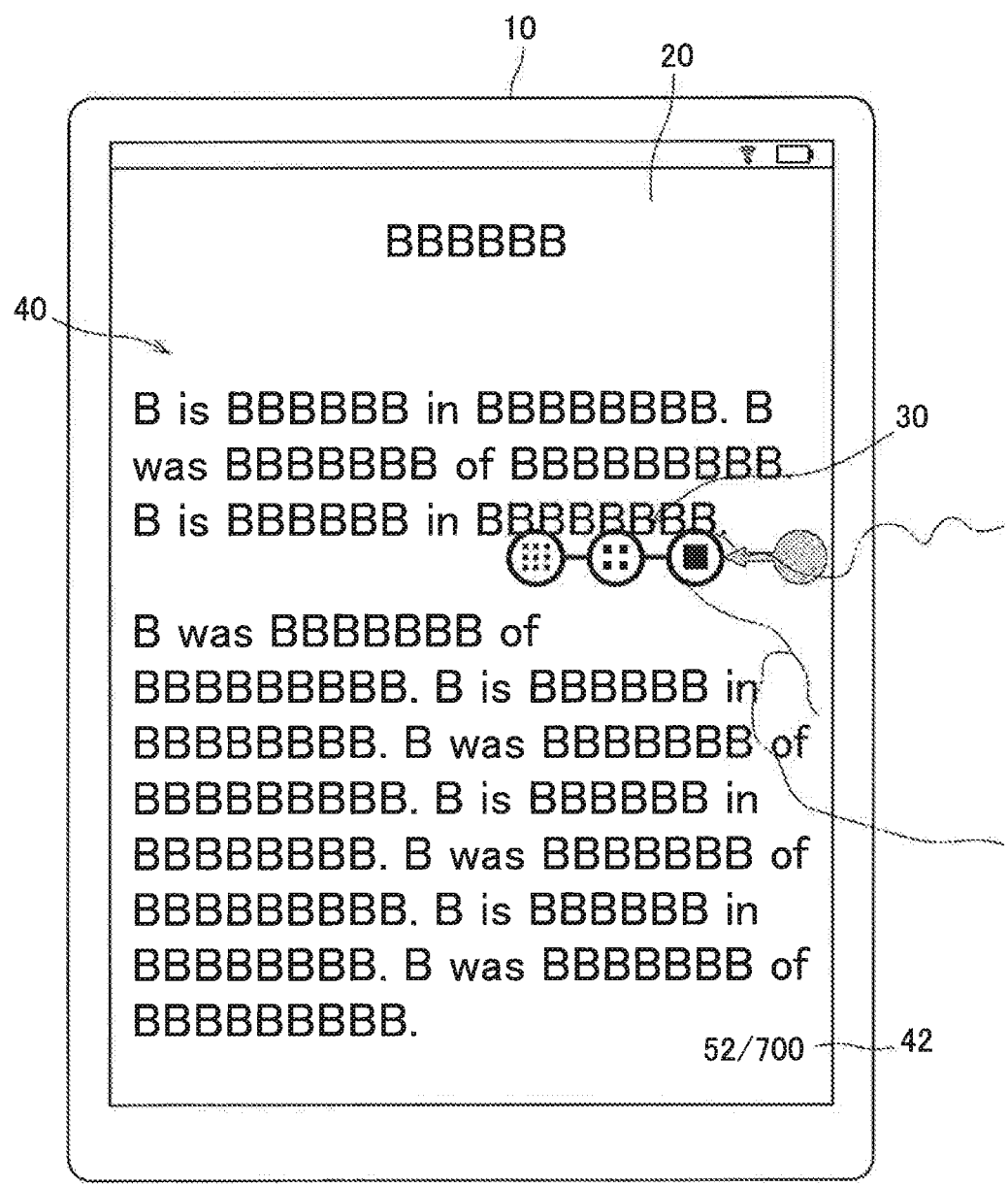
FIG. 5 is an explanatory diagram illustrating a display example of pages according to the embodiment.

The display control unit 104 makes the display screen 20 display a page 40 included in the content data that is stored in a storage unit 112 to be described later for instance, as illustrated in FIG. 5. For instance, the display control unit 104 makes the display screen 20 display the pages continuously fed by the page feed unit 106 to be described later. More specifically, every time the page is fed by the page feed unit 106, the display control unit 104 switches the page currently displayed on the display screen 20 to the page fed by the page feed unit 106 and makes the display screen 20 display the page.

Also, when the pages are fed by the page feed unit 106, the display control unit 104 can change the number of the pages to be displayed on the display screen 20 according to the touch operation by the user detected by the operation detection unit 102.

For instance, as illustrated in FIG. 5, the display control unit 104 can display a page number of a current page which is the page currently displayed on the display screen 20 and the total number of the pages included in the content data in a page number display column 42. FIG. 5 illustrates an example of displaying respectively that the page number of the current page is "52" and the total number of the pages is "700".

(3-1-3-2. Control Example 2)

Also, the display control unit 104 can make the display screen 20 display an indicator 30 for making the user specify the number of the pages to be displayed on the display screen 20 while the pages are fed by the page feed unit 106 to be described later. While details will be described later, the page feed unit 106 feeds the pages basically while the holding operation is detected after the sliding operation by the user is detected by the operation detection unit 102.

The indicator 30 is one example of a guide in the present disclosure. The indicator 30 includes an image illustrating a plurality of candidates for the number of the pages to be displayed on the display screen 20.

Here, the above-described function will be described in more detail with reference to FIG. 5. FIG. 5 is an explanatory diagram illustrating one example of display control of the pages by the display control unit 104. As illustrated in FIG. 5, for instance, when the sliding operation by the user to the display screen 20 is detected by the operation detection unit 102, the display control unit 104 makes the indicator 30 be displayed at a position of the finger of the user on the display screen 20.

The display control unit 104 can also move a display position of the indicator 30 following movement of the finger of the user on the display screen 20. For instance, when the finger of the user is moved upwards while touching the display screen 20, the display control unit 104 moves the display position of the indicator 30 upwards according to the movement of the finger of the user.

(3-1-3-3. Control Example 3)

Also, the display control unit 104 can make the display screen 20 display the pages in the number specified by the user in the indicator 30. For instance, the display control unit 104 makes the display screen 20 display the pages in the number selected by the user in the indicator 30, which is specified by the selection specification unit 108, as will be described later.

Figure 6:
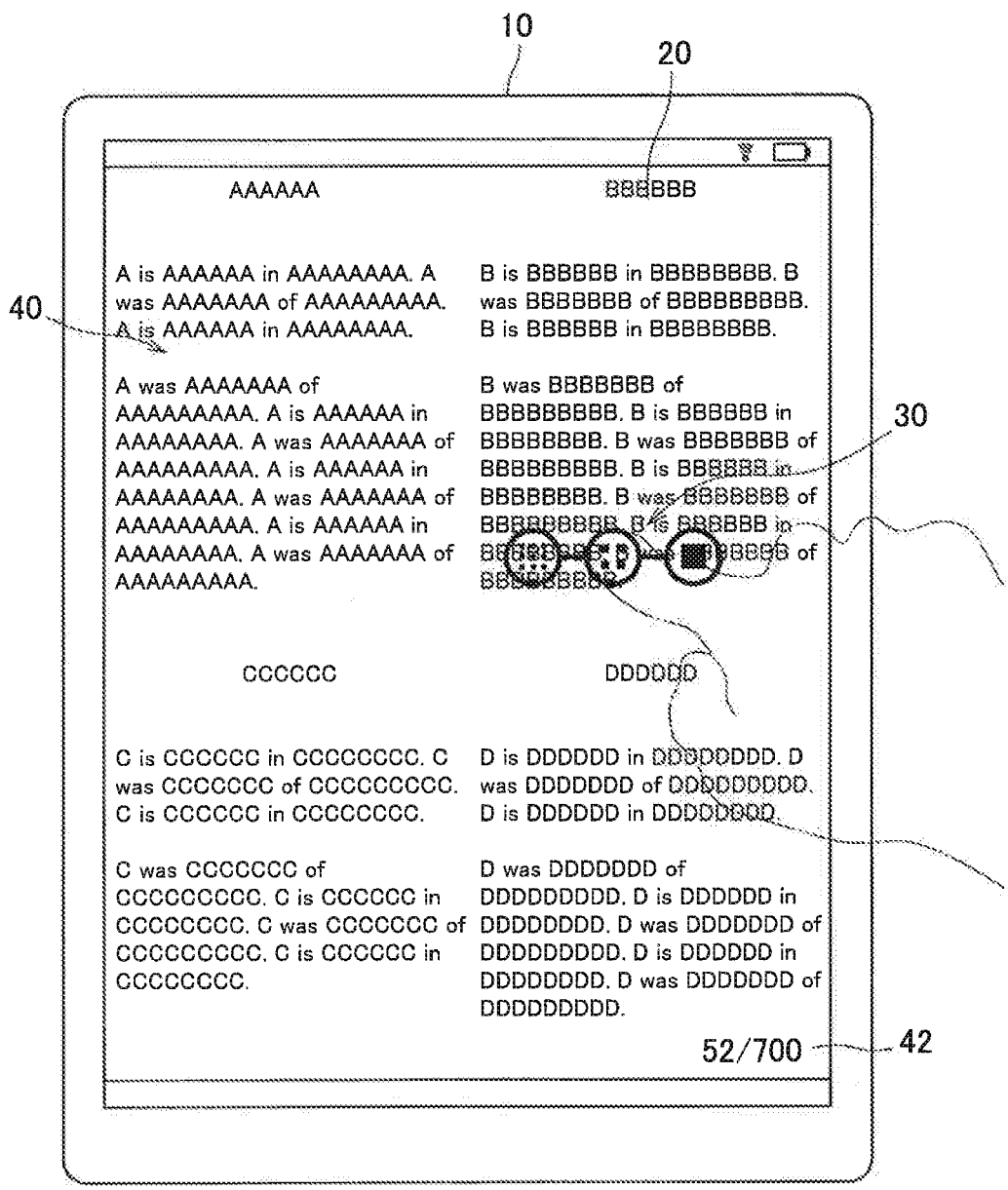
FIG. 6 is an explanatory diagram illustrating a display example of pages according to the embodiment.
Figure 7:
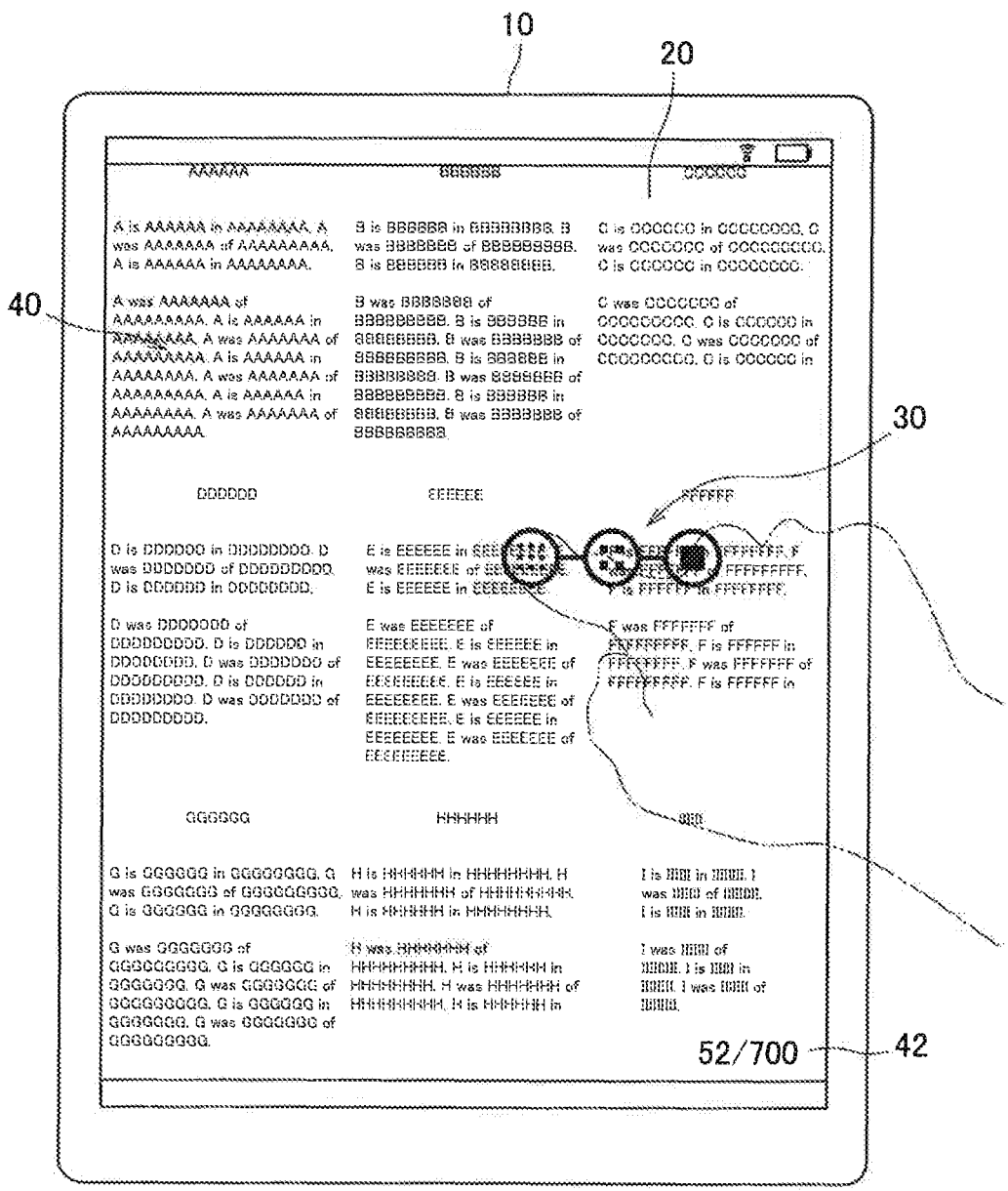
FIG. 7 is an explanatory diagram illustrating a display example of pages according to the embodiment.

Here, the above-described function will be described in more detail with reference to FIG. 5 to FIG. 7. FIG. 5 to FIG. 7 illustrate an example that the indicator 30 is the image of making the user select the number of the pages to be displayed on the display screen 20 from one of one page, four pages and nine pages.

For instance, as illustrated in FIG. 5, when a right candidate image included in the indicator 30 is selected by the user, the display control unit 104 makes the display screen 20 display one page. Also, as illustrated in FIG. 6, when a center candidate image included in the indicator 30 is selected by the user, the display control unit 104 makes the display screen 20 display four pages. As illustrated in FIG. 7, when a left candidate image included in the indicator 30 is selected by the user, the display control unit 104 makes the display screen 20 display nine pages.

Note that, the image of the indicator 30 is not limited to the image for which the plurality of candidate images are linearly arranged as illustrated in FIG. 5 to FIG. 7. For instance, the image of the indicator 30 may be the image for which the plurality of candidate images are arranged in a ring shape. As one example, it may be the image for which the candidate image for displaying four pages is arranged at the top, the candidate image for displaying one page is arranged at the lower left, and the candidate image for displaying nine pages is arranged at the lower right like positions of individual vertexes of a triangle in the ring shape.

In the present embodiment, basically, it is assumed that arrangement order of the pages is fixedly set such that, for instance, the page whose page number is the smallest is the page at the top on the left and the page whose page number is the largest is the page at the bottom on the right. For instance, in the case of 4-page display, the page whose page number is "4(N−1)+1" (N is a positive integer) is arranged at the upper left, and the page whose page number is "4×N" is arranged at the lower right, respectively. Also, in the case of 9-page display, the page whose page number is "9×(N−1)+1" is arranged at the top on the left, and the page whose page number is "9×N" is arranged at the bottom on the right, respectively.

Figure 8:
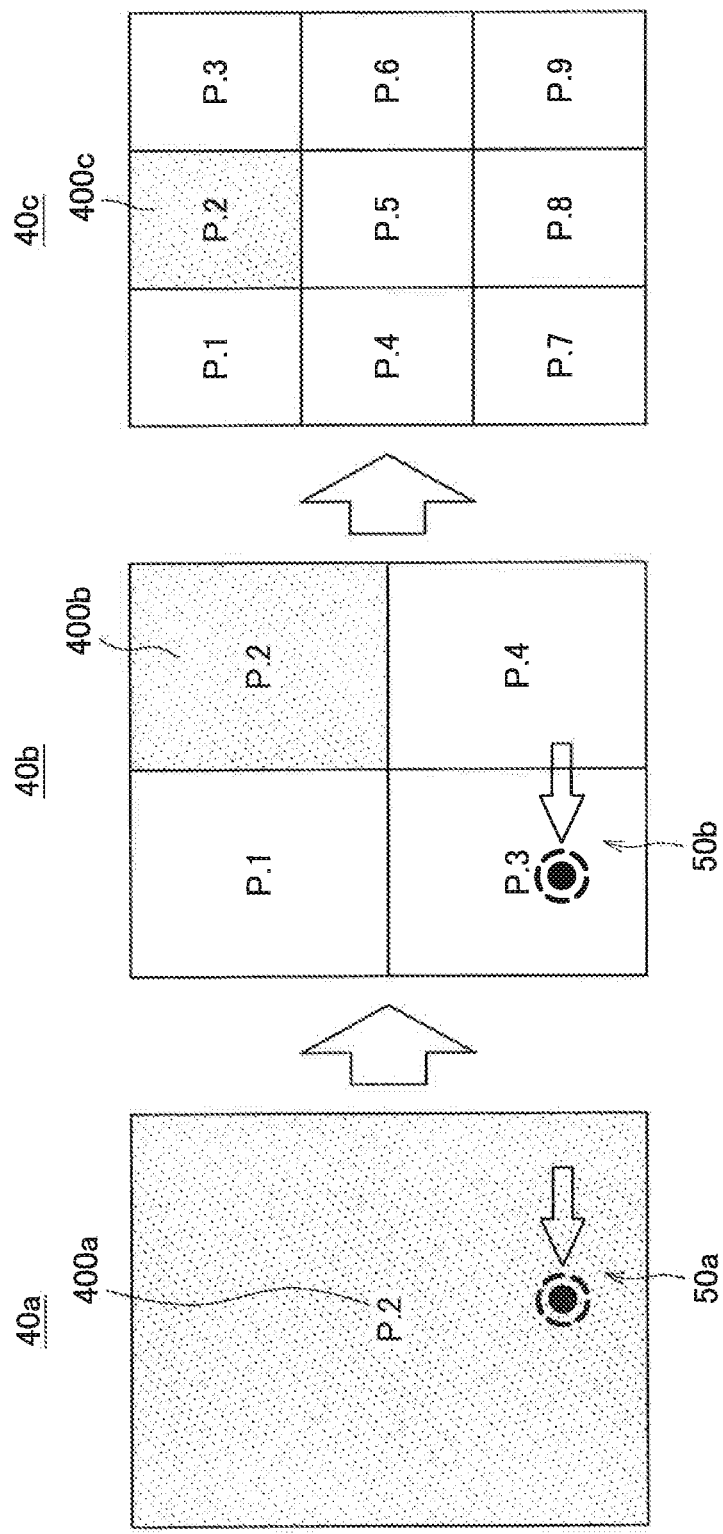
FIG. 8 is an explanatory diagram illustrating a control example of the number of display pages by a display control unit 104 according to the embodiment.

Here, with reference to FIG. 8, the above-described contents will be described in more detail. FIG. 8 is an explanatory diagram illustrating a display example of the pages in the case that the number of the pages to be displayed on the display screen 20 is changed in the order of one page, four pages and nine pages by the user (without feeding the pages). For instance, the number of a current page 400 when one page is displayed is "2(=4×(1−1)+2)" like a page 40*a* in FIG. 8, and when the 4-page display is selected by the user, as illustrated in a page 40*b*, the display control unit 104 makes the current page 400 be displayed at the upper right on the display screen 20. Also, when the 9-page display is selected by the user, as illustrated in a page 40*c*, the display control unit 104 makes the current page 400 be displayed at the center of an upper stage on the display screen 20.

(3-1-3-4. Control Example 4)

Figure 9:
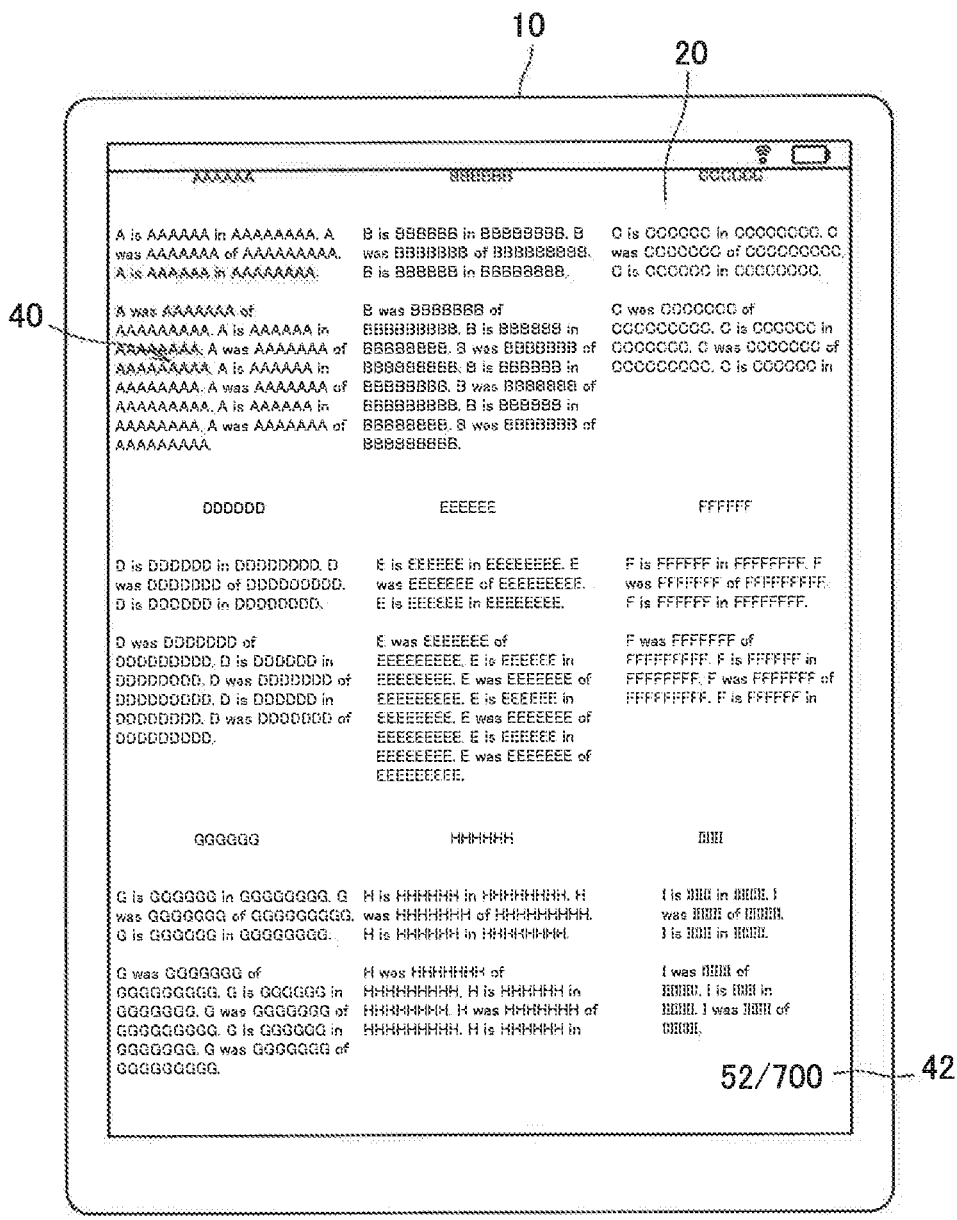
FIG. 9 is an explanatory diagram illustrating a display example of pages according to the embodiment.

Also, when the page feed is stopped by the page feed unit 106 to be described later, the display control unit 104 can display the page keeping the number of the pages displayed on the display screen 20 when the page feed is stopped. For instance, when the pages are fed in units of nine pages and then the page feed is stopped by the page feed unit 106, as illustrated in FIG. 9, the display control unit 104 makes the pages be displayed with the number of the pages defined as nine pages.

(3-1-3-5. Control Example 5)

Also, in the state that the page feed is stopped by the page feed unit 106, when it is detected by the operation detection unit 102 that a position corresponding to one of the pages displayed on the display screen 20 is selected by the touch of the user or the like for instance, the display control unit 104 can make the display screen 20 display the page selected by the user.

Figure 10:
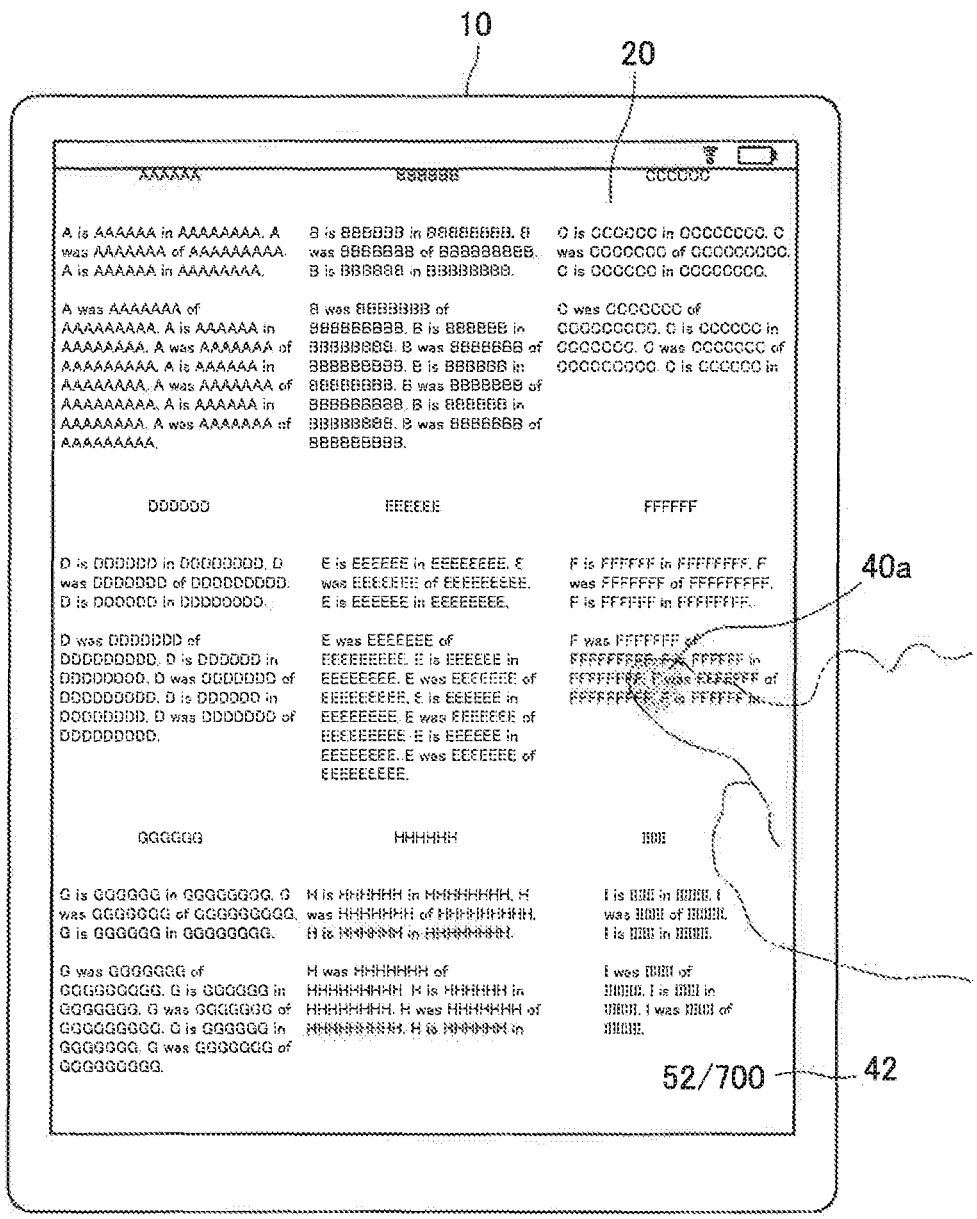
FIG. 10 is an explanatory diagram illustrating a display example of pages according to the embodiment.
Figure 11:
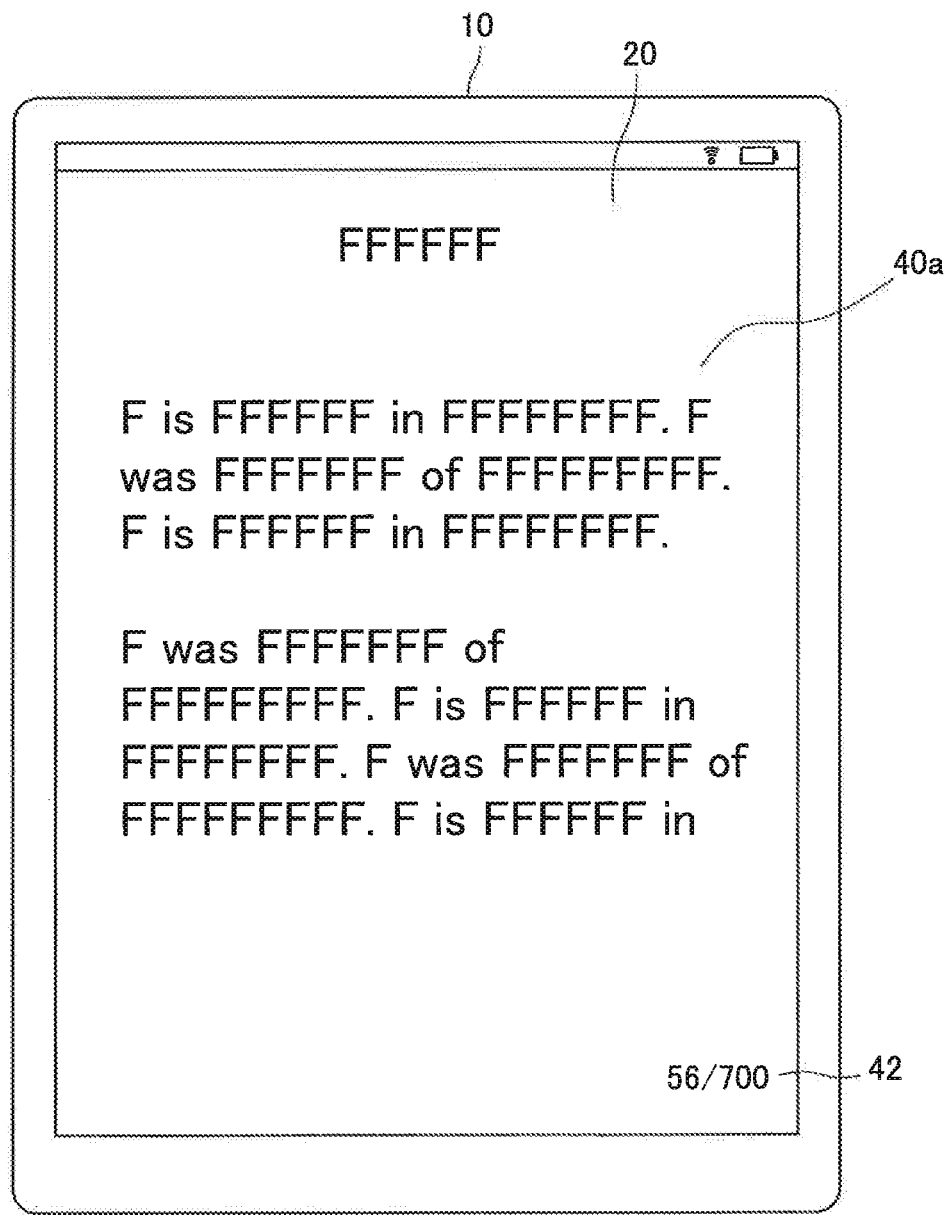
FIG. 11 is an explanatory diagram illustrating a display example of pages according to the embodiment.

Here, with reference to FIG. 10 to FIG. 11, the above-described function will be described in more detail. FIG. 10 is an explanatory diagram illustrating a scene where the page 40*a* is selected by the user from nine pages displayed on the display screen 20 when the pages are displayed as illustrated in FIG. 9. When the page 40*a* is selected by the user as illustrated in FIG. 10, the display control unit 104 makes the display screen 20 display the page 40*a* selected by the user by 1-page display as illustrated in FIG. 11.

(3-1-3-6. Control Example 6)

When it is detected by the operation detection unit 102 that the finger made to touch by the user on the display screen 20 is dragged in an upward direction for instance during the page feed by the page feed unit 106 to be described later, the display control unit 104 can make the display screen 20 further display additional information such as a scroll bar for scrolling a display page or an explanation sentence related to the current page, for instance. Also, further, when it is detected by the operation detection unit 102 that the finger made to touch by the user is dragged in a downward direction for instance and returned to an original position, the display control unit 104 can delete the (above-described) additional information that is additionally displayed,

[3-1-4. Page Feed Unit 106]

(3-1-4-1. Page Feed Example 1)

The page feed unit 106 continuously feeds the pages in the content data stored in the storage unit 112 for instance. For instance, the page feed unit 106 continuously feeds the pages when the holding operation by the user is detected after the operation that the user slides the finger in one direction is detected by the operation detection unit 102. More specifically, when the holding operation by the user is detected after the operation that the user slides the finger in a left direction is detected by the operation detection unit 102, the page feed unit 106 continuously feeds the pages in a forward direction like "p1→p2→ . . . " for instance. Also, when the holding operation by the user is detected after the operation that the user slides the finger in a right direction is detected by the operation detection unit 102, the page feed unit 106 continuously feeds the pages in a reverse direction like "p5→p4→ . . . " for instance.

(3-1-4-2. Page Feed Example 2)

Also, the page feed unit 106 can continuously feed the pages in units of the number of the pages specified on the basis of a selecting operation by the user to the indicator 30 for instance by the selection specification unit 108 to be described later. For instance, as illustrated in FIG. 5, when one page is displayed on the display screen 20, the page feed unit 106 continuously feeds the pages in units of one page. Similarly, the page feed unit 106 continuously feeds the pages respectively in units of four pages in the example illustrated in FIG. 6, and in units of nine pages in the example illustrated in FIG. 7.

A speed of feeding the pages by the page feed unit 106 can be set so as to be independent of the number of the pages to be displayed on the display screen 20. That is, even when the number of the pages to be displayed on the display screen 20 is increased or decreased by the user, the speed of feeding the pages by the page feed unit 106 is not changed. An example of the effect is that the user can make an adjustment so as to easily confirm the contents of the pages by changing the number of the pages when the pages are continuously fed. For instance, by increasing the number of display pages, the user can confirm the contents of the continuous pages more quickly in a short time. Also, by reducing the number of the display pages, the user can confirm the contents of the continuous pages in more detail.

(3-1-4-3. Page Feed Example 3)

Also, the page feed unit 106 can continuously feed the pages only while the holding operation to the display screen 20 by one finger of the user for instance is detected by the operation detection unit 102 after the page feed is started.

Figure 12:
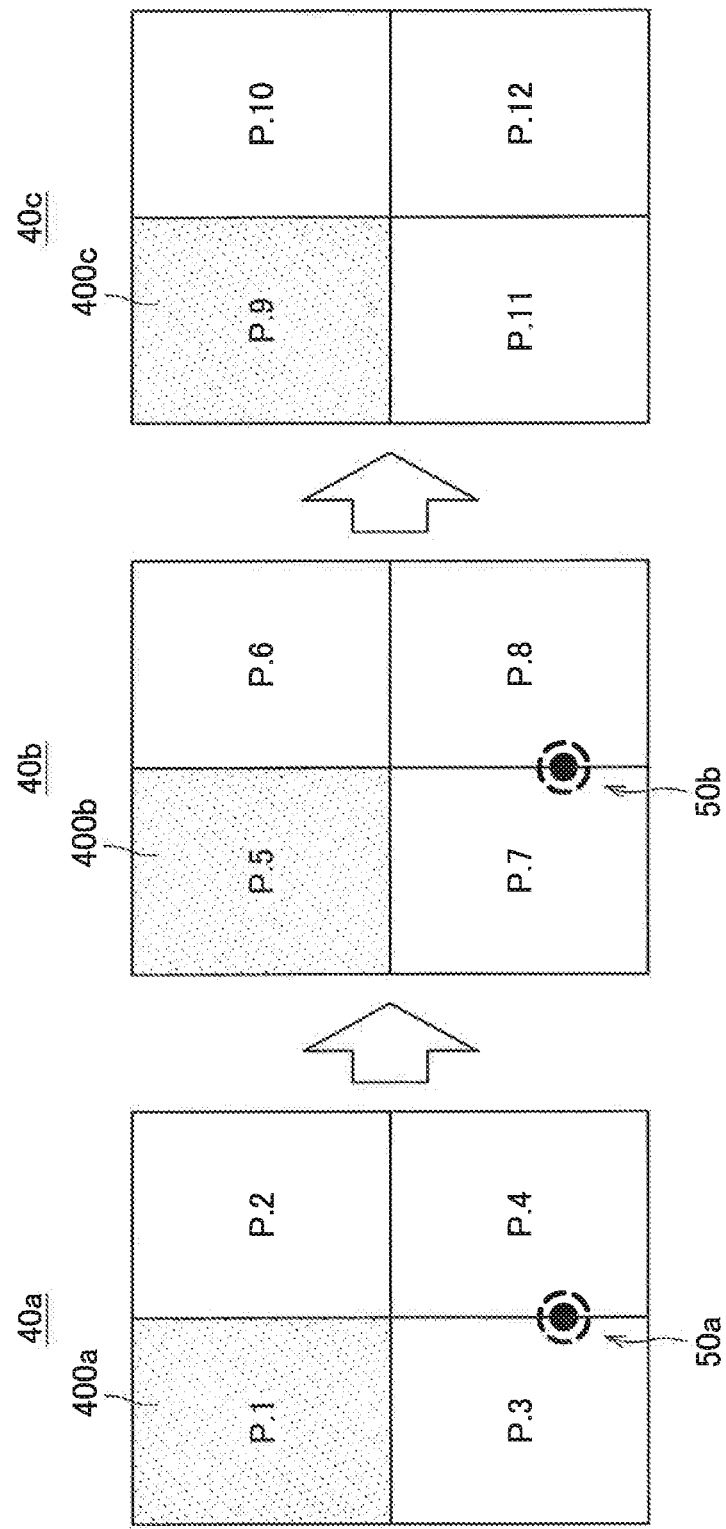
FIG. 12 is an explanatory diagram illustrating one example of page feed by a page feed unit 106 according to the embodiment.

FIG. 12 is an explanatory diagram illustrating an example that the pages are continuously fed by the page feed unit 106 when four pages are displayed. As illustrated in FIG. 12, when a holding operation 50 by the user to the display screen 20 is detected by the operation detection unit 102, the page feed unit 106 continuously feeds the pages in units of four pages, that is in units of the number of the pages displayed on the display screen 20, in the order of the page 40a, the page 40b and the page 40c.

(3-1-4-4. Page Feed Example 4)

Also, the page feed unit 106 can temporarily stop the page feed when it is detected by the operation detection unit 102 that the second finger of the user is made to touch the display screen 20 further during the page feed. Further, the page feed unit 106 can also restart the page feed when it is detected by the operation detection unit 102 that the second finger of the user is released from the display screen 20.

Also, as a modification, the page feed unit 106 can temporarily stop the page feed when it is detected by the operation detection unit 102 that the finger made to touch by the user on the display screen 20 is dragged in the downward direction during the page feed. The page feed unit 106 can also further restart the page feed when it is detected by the operation detection unit 102 that the finger made to touch by the user is returned to an original position by being dragged in the upward direction for instance.

According to the page feed example 4, while the pages are being continuously fed, the user can confirm the contents of the pages in detail by temporarily stopping the page feed when the page including an interesting sentence or image or the like is found or the like for instance.

(3-1-4-5. Page Feed Example 5)

Also, when the number of the pages displayed on the display screen 20 is changed, the page feed unit 106 can set the number of the current page on the basis of the number of the pages after the change during the page feed after the change. For instance, during the page feed after the number of the pages is changed, the page feed unit 106 sets the number of the current page to the number of the page corresponding to a predetermined position such as the top on the left for instance in the number of pages after the change.

Figure 13:
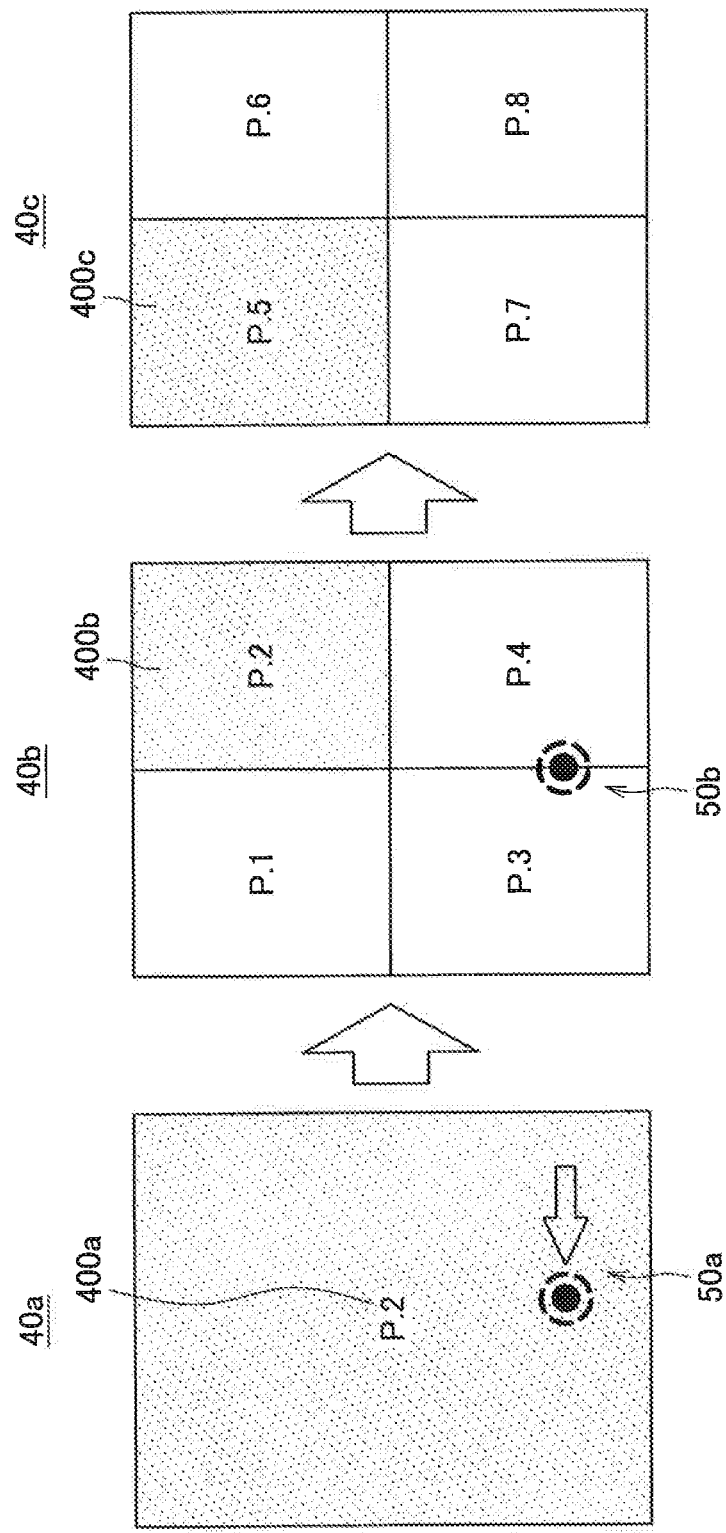
FIG. 13 is an explanatory diagram illustrating one example of page feed by the page feed unit 106 according to the embodiment.

Here, with reference to FIG. 13, the above-described function will be described in more detail. FIG. 13 is an explanatory diagram illustrating an example that the number of the pages to be displayed on the display screen 20 is changed from one page to four pages by the user and then the pages are fed (in the forward direction). As illustrated in the page 40b in FIG. 13, in the case that the number of the current page when the 1-page display is changed to the 4-page display by the user is "2(=4×(1−1)+2)", the page feed unit 106 sets the number of the current page to "5(=4×(2−1)+1)" which is the page number corresponding to the upper left position in the 4-page display during the first page feed after the change, as illustrated in the page 40c.

According to the page feed example 5, when the number of the pages is changed, by resetting the number of the current page, the arrangement order itself of the pages is not changed. Therefore, even when the number of the pages is changed while continuously feeding the pages, the user feels no discomfort with the arrangement of the pages.

(3-1-4-6. Page Feed Example 6)

Also, the page feed unit 106 can change a direction of feeding the pages according to a direction of the slide by the user to the display screen 20 that is detected by the operation detection unit 102.

Figure 14:
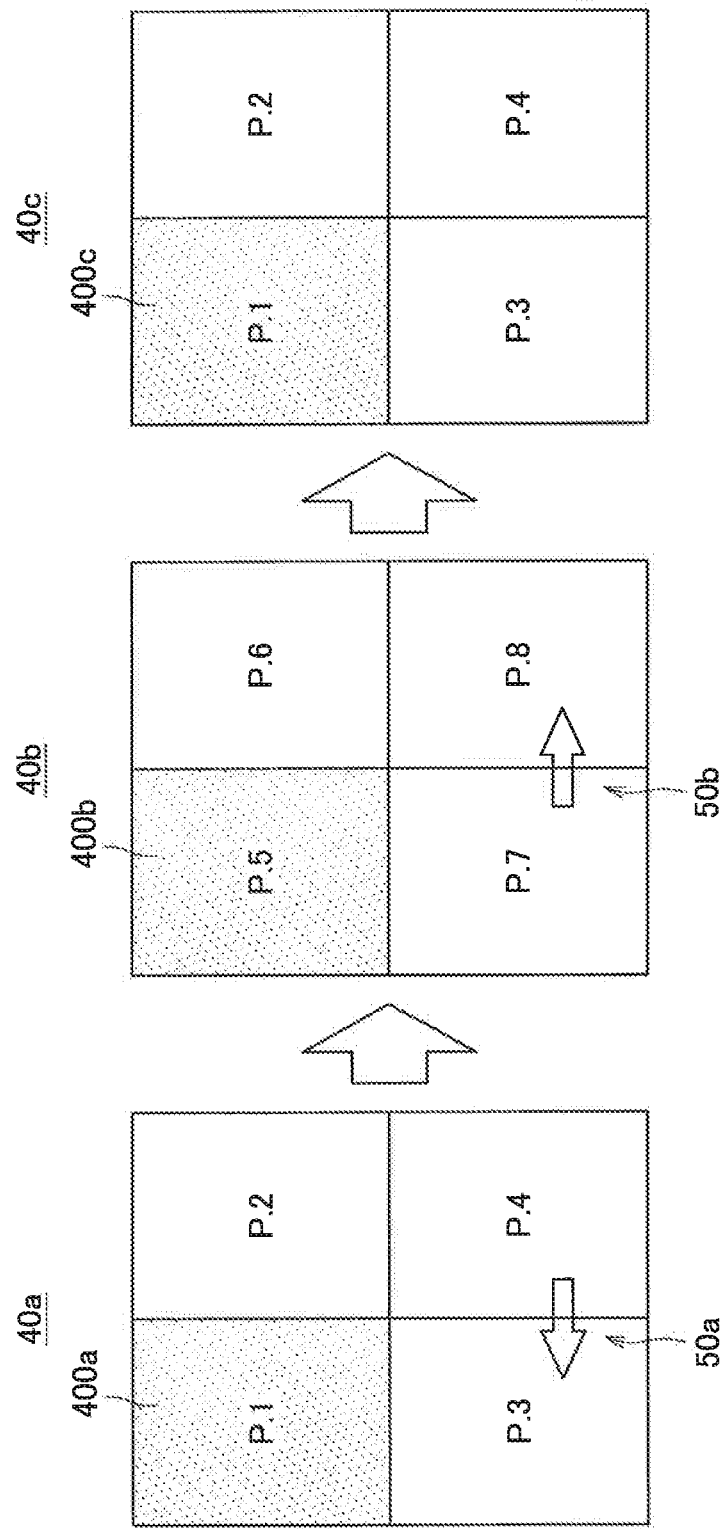
FIG. 14 is an explanatory diagram illustrating one example of page feed by the page feed unit 106 according to the embodiment.

Here, with reference to FIG. 14, the above-described function will be described in more detail. FIG. 14 is an explanatory diagram illustrating one example of the page feed in the case that the sliding operation is performed in the left direction or in the right direction by the user to the display screen 20. For instance, when it is detected by the operation detection unit 102 that the slide is performed in the left direction by the user to the display screen 20 as illustrated in the page 40a, the page feed unit 106 feeds the pages in the forward direction as illustrated in the page 40b. Also, when it is detected by the operation detection unit 102 that the slide is performed in the right direction by the user to the display screen 20 as illustrated in the page 40b, the page feed unit 106 feeds the pages in the reverse direction as illustrated in the page 40c.

(3-1-4-7. Page Feed Example 7)

Also, the page feed unit 106 can lower the speed of feeding the pages when the final page of the contents approaches in the middle of feeding the pages forward. Also, the page feed unit 106 can lower the speed of feeding the pages when the first page of the contents approaches in the middle of feeding the pages reversely.

According to the page feed example 7, by lowering the speed of feeding the pages, it can be reported to the user that the final page (or the first page) of the contents is approaching.

[3-1-5. Selection Specification Unit 108]

The selection specification unit 108 can specify the candidate selected by the user among the plurality of candidates for the number of the pages that are included in the indicator 30, on the basis of a detection result by the operation detection unit 102. More specifically, the selection specification unit 108 can specify which candidate is selected by the user among the plurality of candidates for the number of the pages that are included in the indicator 30, according to a slide amount of the finger of the user in one direction on the display screen 20, which is detected by the operation detection unit 102.

For instance, in the example illustrated in FIG. 5 to FIG. 7, when it is detected by the operation detection unit 102 that the slide amount of the finger of the user in the left direction on the display screen 20 is smaller than a first threshold amount, the selection specification unit 108 specifies that the number of the pages (that is one page) indicated by the candidate image on the right side included in the indicator 30 is selected by the user. Similarly, when it is detected by the operation detection unit 102 that the slide amount of the finger of the user in the left direction on the display screen 20 is equal to or larger than a second threshold amount which is an amount larger than the first threshold amount, the selection specification unit 108 specifies that the number of the pages (that is nine pages) indicated by the candidate image on the left side included in the indicator 30 is selected by the user. Also, when it is detected by the operation detection unit 102 that the slide amount of the finger of the user in the left direction on the display screen 20 is equal to or larger than the first threshold amount and is smaller than the second threshold amount, the selection specification unit 108 specifies that the number of the pages (that is four pages) indicated by the candidate image at the center included in the indicator 30 is selected by the user.

[3-1-6. Display Unit 110]

The display unit 110 can display the display screen 20 according to the control by the display control unit 104.

[3-1-7. Storage Unit 112]

The storage unit 112 can store the content data such as document data including the plurality of pages, for instance.

<3-2. Operation>

The configuration according to the present embodiment has been described above. Subsequently, the operation according to the present embodiment will be described.

Figure 15:
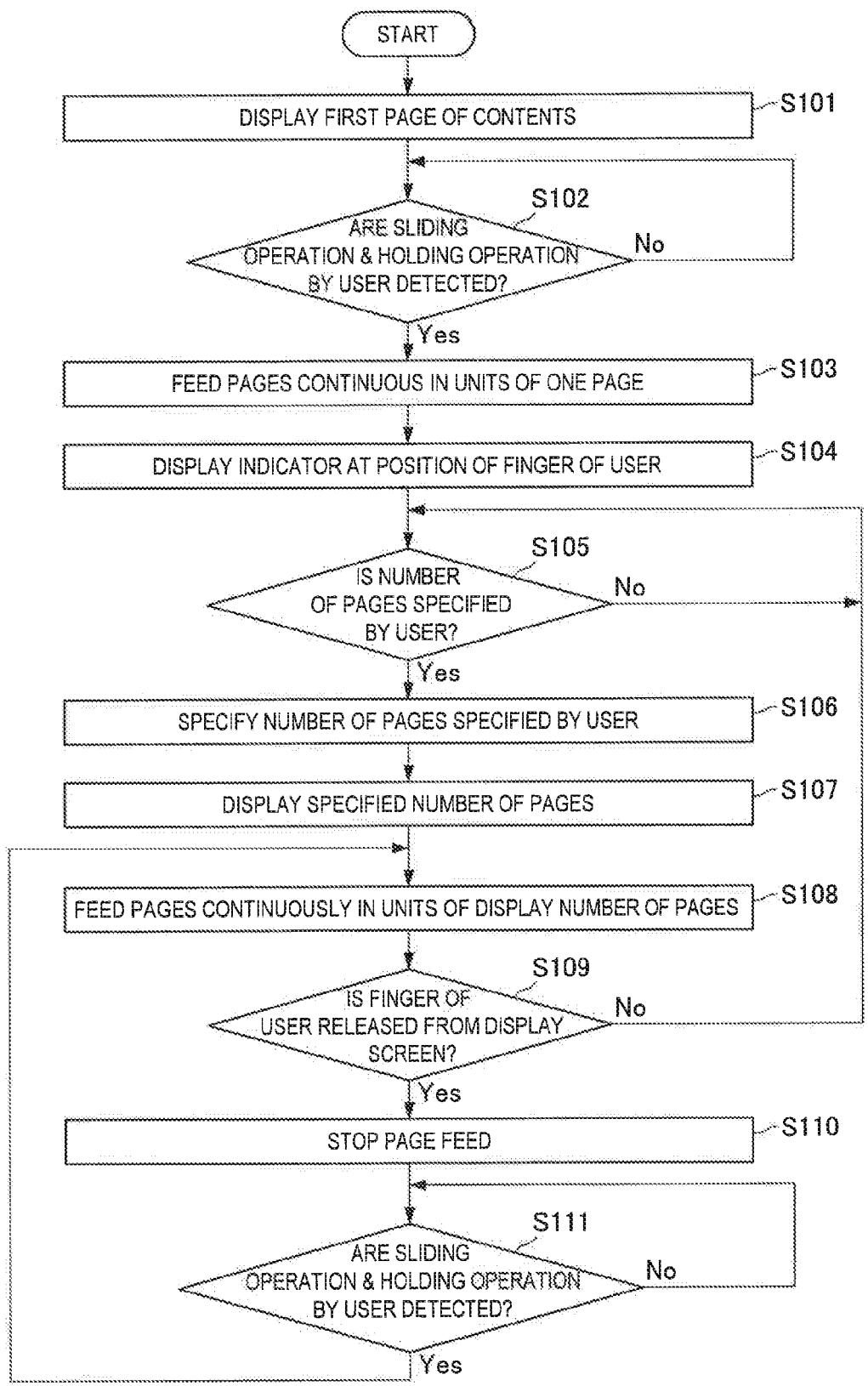
FIG. 15 is a flowchart illustrating operations according to the embodiment.

FIG. 15 is a flowchart illustrating the operation according to the present embodiment. As illustrated in FIG. 15, first, when input for displaying the contents by the user is detected by the operation detection unit 102 for instance, the display control unit 104 makes the display screen 20 display the first page included in the content data stored in the storage unit 112 (S101).

Thereafter, the control unit 100 stands by until the sliding operation and the holding operation by the user to the display screen 20 are detected by the operation detection unit 102 (S102).

When the holding operation is detected after the sliding operation by the user is detected by the operation detection unit 102 (S102: Yes), the page feed unit 106 continuously feeds the pages in units of one page. Then, according to the page feed by the page feed unit 106, the display control unit 104 makes the display screen 20 display the page being fed (S103).

Next, the display control unit 104 makes the indicator 30 be displayed at the position of the finger held by the user on the display screen 20 (S104).

Thereafter, the control unit 100 stands by until the selecting operation for the number of the pages to the indicator 30 like the operation of sliding the finger in the left direction from the state that the finger is held for instance is detected by the operation detection unit 102 (S105).

When the selecting operation for the number of the pages is detected by the operation detection unit 102 (S105: Yes), the selection specification unit 108 specifies the number of the pages specified by the user on the basis of the selecting operation detected by the operation detection unit 102 (S106).

Then, the display control unit 104 makes the display screen 20 display the pages in the number specified by the selection specification unit 108 (S107).

Subsequently, the page feed unit 106 continuously feeds the pages in units of the number of the pages specified by the selection specification unit 108. Then, the display control unit 104 makes the display screen 20 display the page being fed according to the page feed by the page feed unit 106 (S108).

Next, the control unit 100 determines whether or not it is detected by the operation detection unit 102 that the finger of the user is released from the display screen 20 (S109). When it is not detected by the operation detection unit 102 that the finger of the user is released from the display screen 20 (S109: No), the electronic paper 10 repeats the operation of S105.

On the other hand, when it is detected by the operation detection unit 102 that the finger of the user is released from the display screen 20 (S109: Yes), the page feed unit 106 stops the page feed (S110). Thereafter, the control unit 100 stands by until the sliding operation and the holding operation by the user to the display screen 20 are detected by the operation detection unit 102 (S111). When the holding operation is detected after the sliding operation by the user is detected by the operation detection unit 102 (S111: Yes), the electronic paper 10 repeats the operation of S108.

<3-3. Effect>

As described above with reference to FIG. 4, FIG. 15 and the like for instance, the electronic paper 10 according to the present embodiment continuously feeds the pages in the contents including the plurality of pages, and then changes the number of the pages to be displayed on the display screen 20 according to the sliding operation by the user when feeding the pages. Therefore, it is possible to improve the convenience in the scene where the user confirms the contents of the continuous pages.

For instance, by increasing the number of the display pages when feeding the pages, the user can confirm the contents of the continuous pages in a short time. Particularly, when the large number of the pages are included in the contents and the user vaguely remembers the image of the page that the user is searching, the user can find a desired page in a short time. Also, like the case that the user is a university professor or a researcher or the like, when the user has to read a document including the large amount of pages, it is possible to substantially improve work efficiency when searching the desired page.

Also, by reducing the number of the display pages in the middle of the page feed, the user can confirm the contents of the continuous pages in more detail. Particularly, when the user recognizes that the page the user is searching is approaching in the middle of the page feed, the user can surely find the desired page.

Also, the electronic paper 10 can be configured to be thin and light in weight. Therefore, the user rarely feels tired even when holding the electronic paper 10 in one hand and browsing the pages for a long period of time.

<<4. Modification>>

The preferred embodiment of the present disclosure has been described in detail with reference to the appended drawings, but the present disclosure is not limited to the example. It is clear that those skilled in the art to which the present disclosure pertains can conceive various modifications or corrections within technical ideas described in the scope of claims and it should be understood that they of course belong to the technical scope of the present disclosure.

<4-1. Modification 1>

Figure 17:
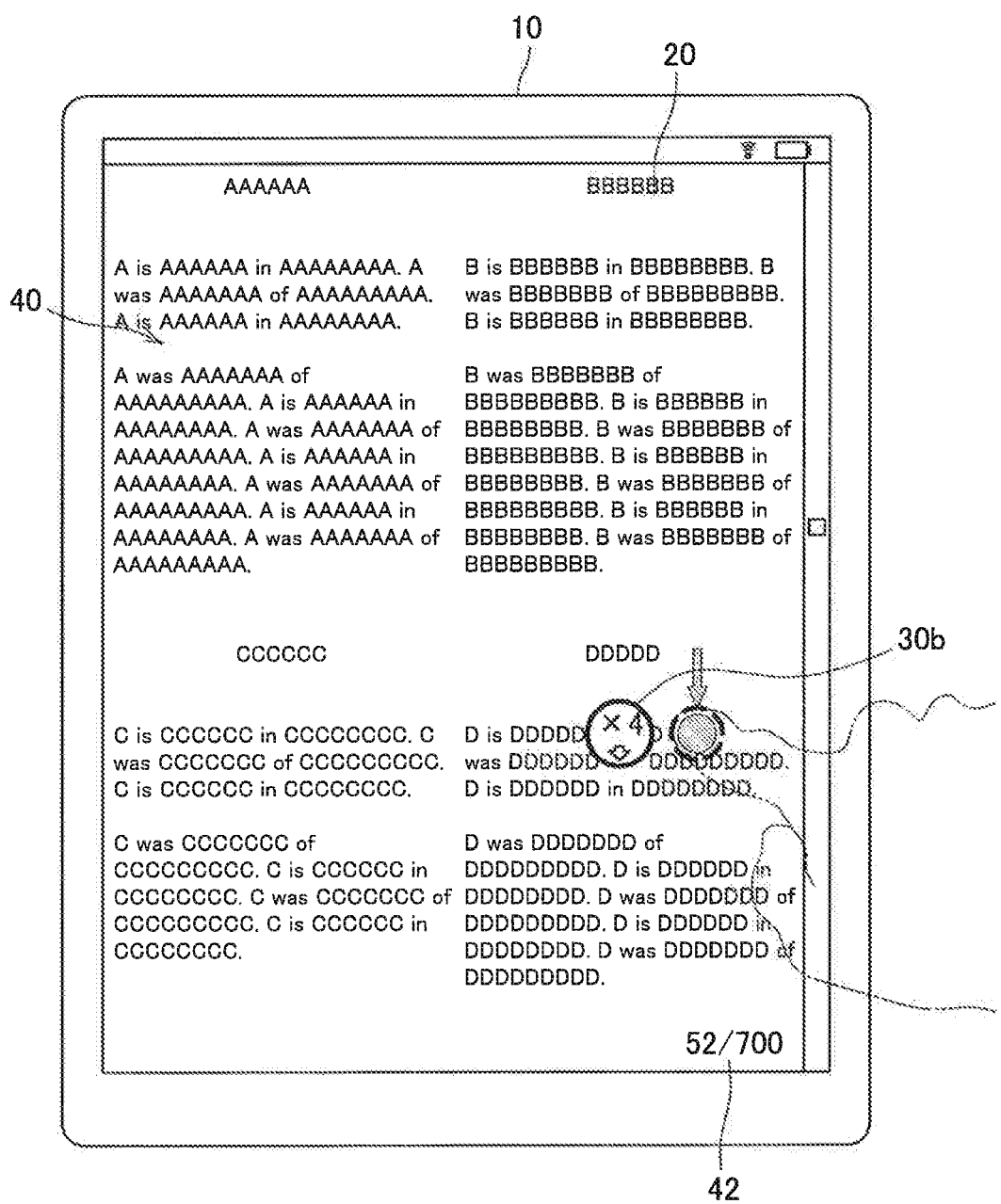
FIG. 17 is an explanatory diagram illustrating a display example of pages according to the modification.
Figure 18:
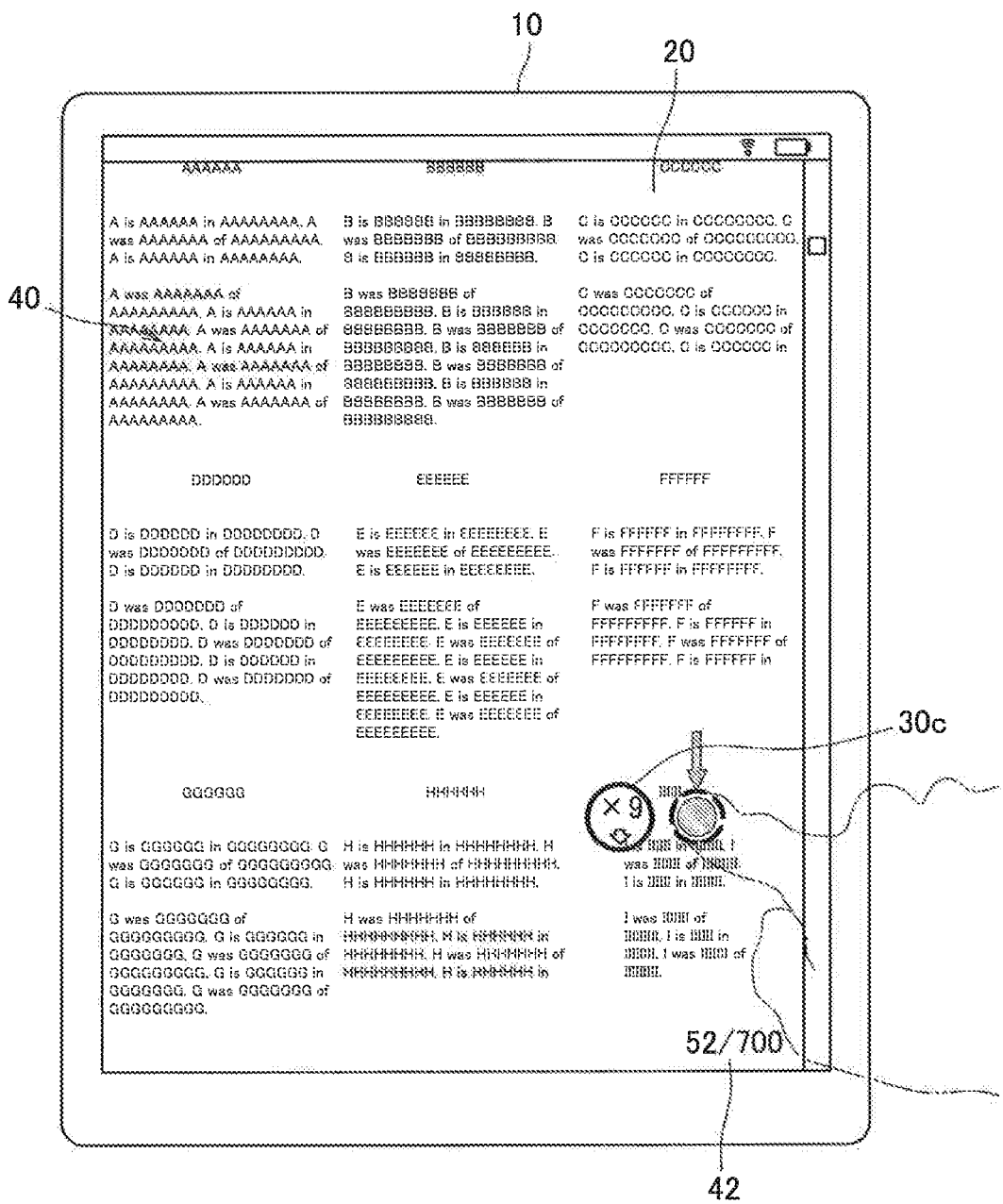
FIG. 18 is an explanatory diagram illustrating a display example of pages according to the modification.

For instance, in the above description, the example that the display control unit 104 changes the number of the display pages according to the sliding operation by the user in the horizontal direction of the display screen 20, which is detected by the operation detection unit 102, has been described; however, the present disclosure is not limited to the example. As a modification 1, the display control unit 104 can change the number of the display pages according to the sliding operation by the user in the vertical direction of the display screen 20, which is detected by the operation detection unit 102, as illustrated in FIG. 16 to FIG. 18 for instance.

Also, the indicator 30 displayed by the display control unit 104 is not limited to the image including the plurality of candidate images for the number of the pages as illustrated in FIG. 5. For instance, the display control unit 104 can also display the image indicating the number of the pages corresponding to the slide amount as the indicator 30 when the sliding operation is performed by the user, as illustrated in FIG. 16 to FIG. 18.

Figure 16:
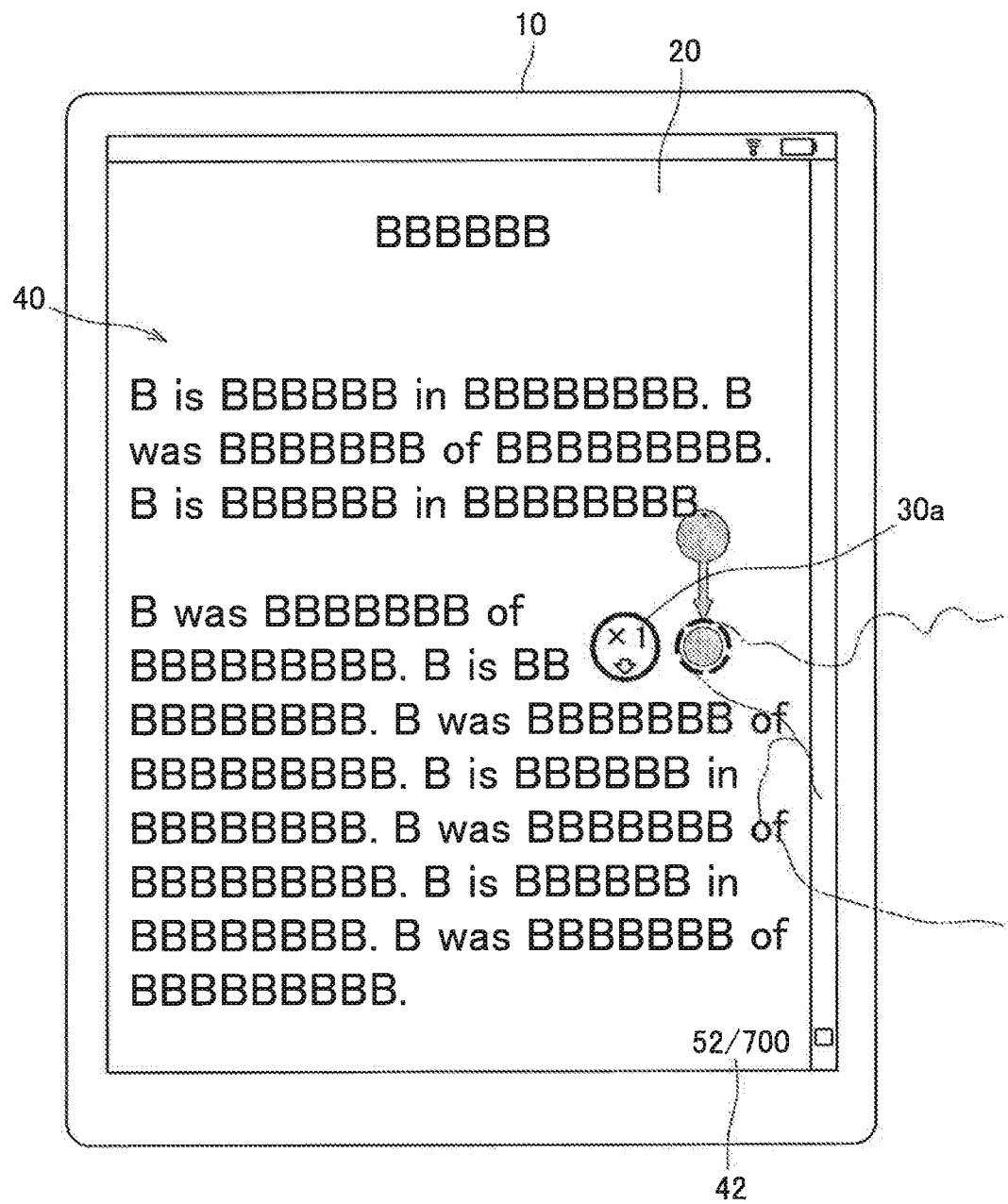
FIG. 16 is an explanatory diagram illustrating a display example of pages according to a modification of the present disclosure.

More specifically, when the slide amount is smaller than the first threshold amount in the middle of the sliding operation by the user, the display control unit 104 makes the display screen 20 display an indicator 30a indicating the 1-page display, as illustrated in FIG. 16. Similarly, when the slide amount is equal to or larger than the first threshold amount and is smaller than the second threshold amount, the display control unit 104 makes the display screen 20 display an indicator 30b indicating the 4-page display, as illustrated in FIG. 17. Also, when the slide amount is equal to or larger than the second threshold amount, the display control unit 104 makes the display screen 20 display an indicator 30c indicating the 9-page display, as illustrated in FIG. 18.

<4-2. Modification 2>

Also, in the above description, the example that the display control unit 104 makes the pages be continuously displayed in the horizontal direction on the display screen 20 when the pages are fed by the page feed unit 106 has been described; however, the present disclosure is not limited to the example. As a modification 2, the display control unit 104 can also make the pages be continuously displayed in the vertical direction when the pages are fed by the page feed unit 106. For instance, when the pages are being fed forward by the page feed unit 106, the display control unit 104 makes the pages being fed be displayed successively from the bottom to the top. Also, when the pages are being fed reversely by the page feed unit 106, the display control unit 104 makes the pages being fed be displayed successively from the lop to the bottom.

<4-3. Modification 3>

Also, as a modification 3, the display control unit 104 can also make a scroll bar 60 for having the user scroll the display pages be displayed at a predetermined location such as an end on the right side for instance on the display screen 20. Further, when the operation of sliding in an upward or downward direction to the scroll bar 60 is detected by the operation detection unit 102, the display control unit 104 can make the pages be non-continuously moved according to the slide amount detected by the operation detection unit 102, and then make the display screen 20 display the pages after the movement.

Figure 19:
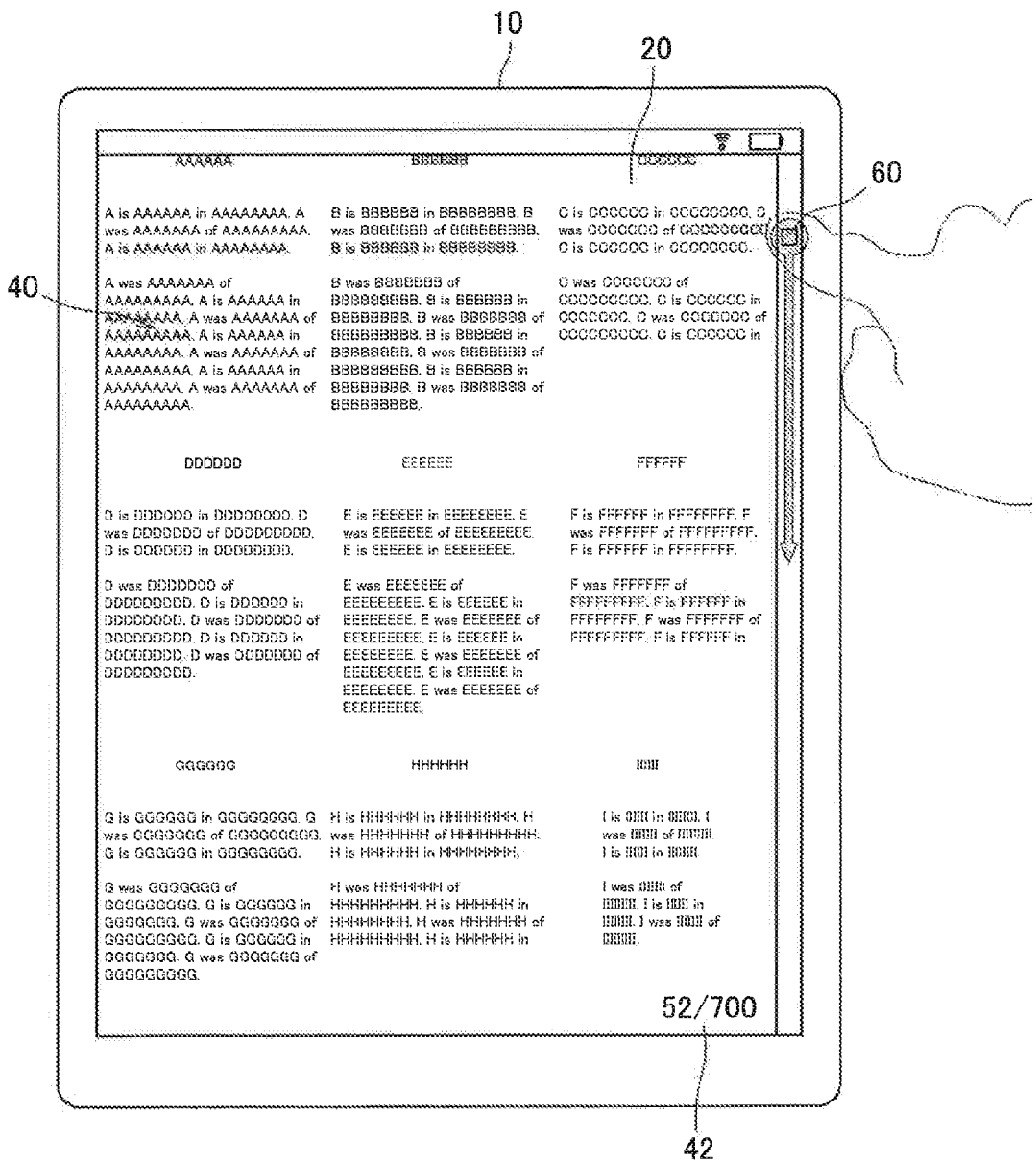
FIG. 19 is an explanatory diagram illustrating a display example of pages according to the modification.
Figure 20:
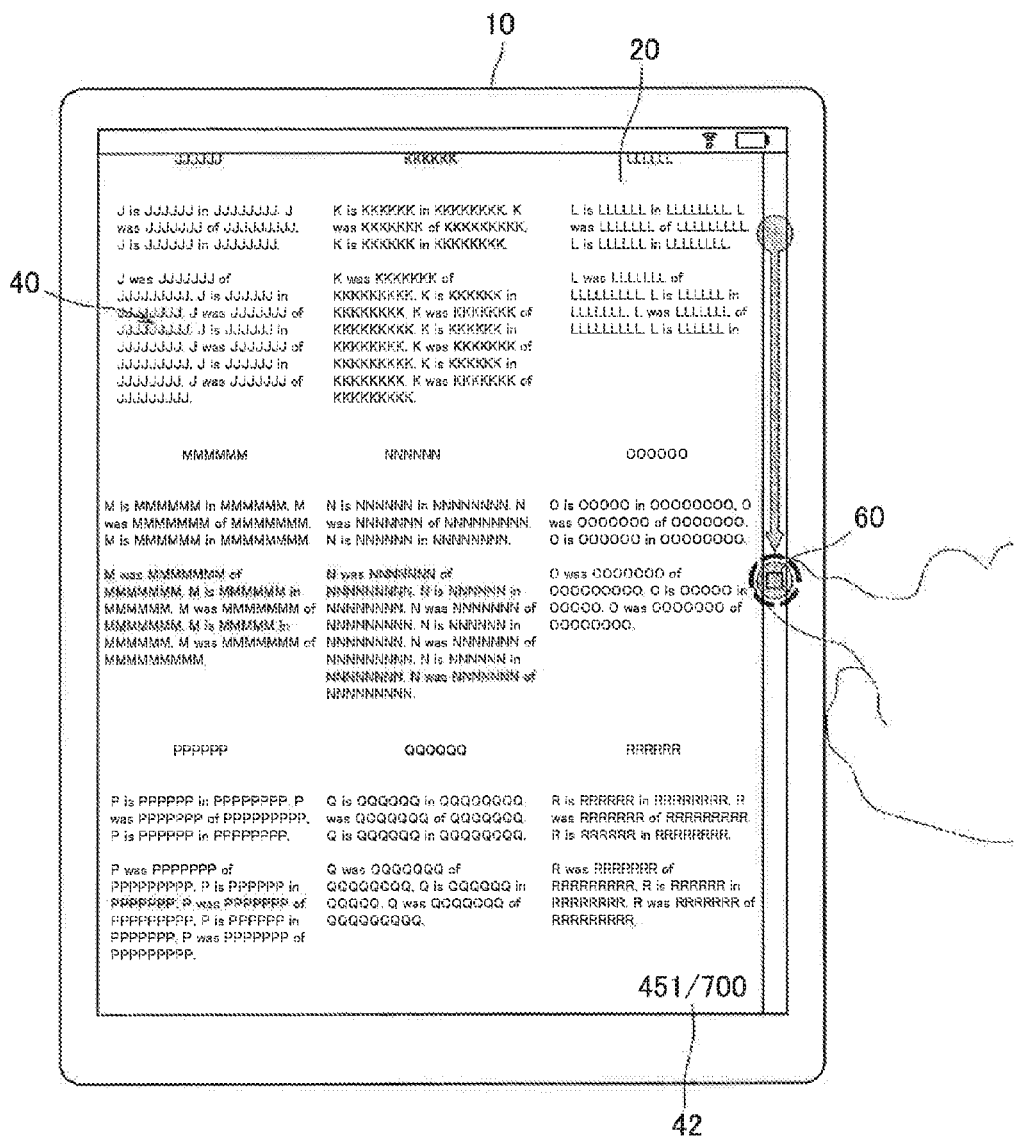
FIG. 20 is an explanatory diagram illustrating a display example of pages according to the modification.

For instance, as illustrated in FIG. 19, in the case that nine pages are displayed on the display screen 20 and the current page is "52", when the user slides the scroll bar 60 in the downward direction, the display control unit 104 moves the current page to a page with the larger page number such as the page number "451" for instance according to the detected slide amount, and makes nine pages that is the same number of the pages be displayed on the display screen 20, as illustrated in FIG. 20.

Also, the electronic paper 10 basically receives the operation of sliding the scroll bar 60 by the user when the page feed by the page feed unit 106 is stopped.

<4-4. Modification 4>

As a modification 4, in the case that the page feed by the page feed unit 106 is stopped, when the operation of sliding the finger in a direction vertical to a slide direction for feeding the pages is detected by the operation detection unit 102, the display control unit 104 can non-continuously move the pages according to the slide amount detected by the operation detection unit 102, and then make the display screen 20 display the pages after the movement.

Figure 21:
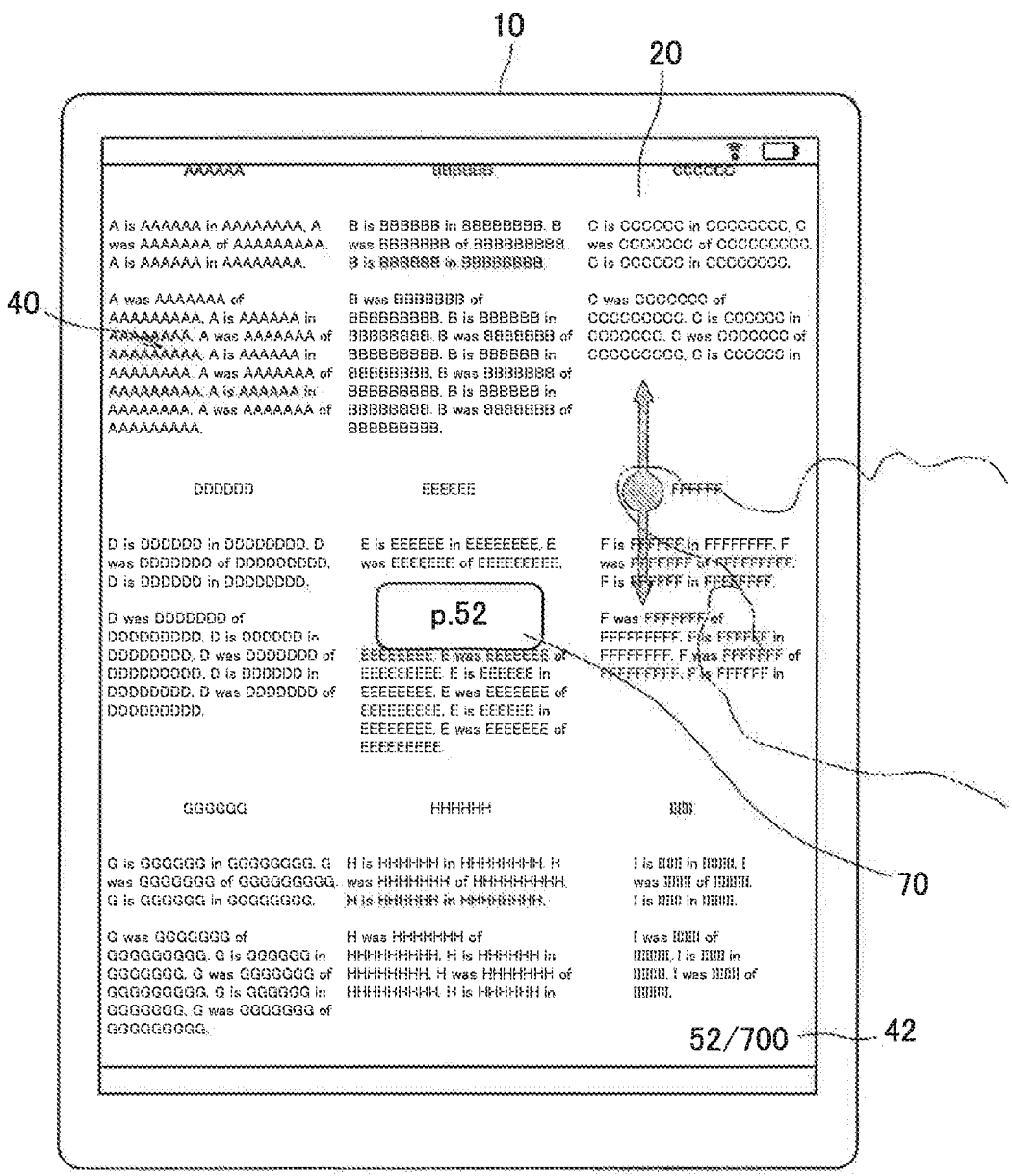
FIG. 21 is an explanatory diagram illustrating a display example of pages according to the modification.

For instance, in the case that the slide direction for feeding the pages is set as the horizontal direction on the display screen 20, as illustrated in FIG. 21, when the operation of sliding in the downward direction at an arbitrary location on the display screen 20 is detected by the operation detection unit 102, the display control unit 104 non-continuously moves the pages in the forward direction according to the slide amount detected by the operation detection unit 102, and then makes the display screen 20 display the pages after the movement. Also, when the operation of sliding in the upward direction by the user is detected by the operation detection unit 102, the display control unit 104 non-continuously moves the pages in the reverse direction according to the slide amount detected by the operation detection unit 102, and then makes the display screen 20 display the pages after the movement.

As illustrated in FIG. 21, the display control unit 104 can also make a page-number-after-movement display column 70 for displaying the page number of the page in the middle of the sliding operation at any time be further displayed on the display screen 20.

According to the page-number-after-movement display column 70, the user can recognize the number of the page to be displayed after the sliding operation during the sliding operation. Therefore, the user can easily make the display screen 20 display the page of the page number desired to be displayed.

<4-5. Modification 5>

Also, as a modification 5, in the case that the page feed by page feed unit 106 is stopped, when the operation of pinch-in or pinch-out by the user on the display screen 20 is detected by the operation detection unit 102, the display control unit 104 can change a magnification rate of the page 40 displayed on the display screen 20 and display the page.

For instance, when the operation of the pinch-in by the user is detected by the operation detection unit 102, the display control unit 104 makes the page 40 displayed on the display screen 20 be reduced and displayed according to an operation amount of the pinch-in detected by the operation detection unit 102. Also, when the operation of the pinch-out by the user is detected by the operation detection unit 102, the display control unit 104 makes the page 40 displayed on the display screen 20 be enlarged and displayed according to the operation amount of the pinch-out detected by the operation detection unit 102.

<4-6. Modification 6>

Also, the information processing device according to an embodiment of the present disclosure is not limited to the electronic paper 10 described above. For instance, the information processing device according to an embodiment of the present disclosure can be configured as a tablet type terminal including a touch panel, a smartphone, or a table type device including a touch panel or the like.

<4-7. Modification 7>

Also, in the above description, the example that the operation by the user is the touch operation to the display screen 20 has been described; however, the present disclosure is not limited to the example. For instance, the operation by the user may be an operation to a mouse. As one example, the sliding operation by the user can be replaced with a drag operation of the mouse, and the holding operation by the user can be replaced with a click operation of the mouse, respectively.

<4-8. Modification 8>

Also, according to the present embodiment, a computer program for making the hardware such as the CPU 150 and the RAM 170 demonstrate the functions equal to the individual configurations of the electronic paper 10 described above can be also provided. A recording medium having the computer program recorded thereon is also provided.

Additionally, the present technology may also be configured as below.

(1)

An information processing device including:

a page feed unit configured to continuously feed pages in contents including a plurality of pages; and a display control unit configured to change the number of the pages to be displayed on a display screen according to an operation by a user when the pages are fed by the page feed unit.

(2)

The information processing device according to (1), wherein the page feed unit continuously feeds the pages in units of the number of the pages to be displayed on the display screen.

(3)

The information processing device according to (1) or (2), wherein a speed of feeding the pages by the page feed unit is independent of the number of the pages to be displayed on the display screen.

(4)

The information processing device according to any one of (1) to (3), further including:

an operation detection unit configured to detect a touch operation by the user to the display screen, wherein the page feed unit continuously feeds the pages when the touch operation by the user is detected by the operation detection unit.

(5)

The information processing device according to (4), wherein the touch operation by the user includes an operation that the user slides a finger on the display screen, and wherein the page feed unit continuously feeds the pages when the operation that the user slides a finger in one direction is detected by the operation detection unit.

(6)

The information processing device according to (4) or (5), wherein when the touch operation by the user is detected by the operation detection unit, the display control unit makes the display screen further display a guide for making the user specify the number of the pages to be displayed on the display screen, and wherein the display control unit makes the display screen display the pages in the number specified by the user in the guide.

(7)

The information processing device according to (6), wherein the guide includes a display that indicates a plurality of candidates for the number of the pages to be displayed on the display screen, wherein the information processing device further includes a selection specification unit configured to specify the candidate selected by the user among the plurality of candidates for the number of the pages included in the guide, on the basis of a detection result by the operation detection unit, and wherein the display control unit makes the display screen display the pages in the number specified by the selection specification unit.

(8)

The information processing device according to (7), wherein the operation by the user includes an operation that the user slides a finger on the display screen, and wherein the selection specification unit specifies which candidate is selected by the user among the plurality of candidates for the number of the pages included in the guide, according to a slide amount of the finger of the user in one direction on the display screen, which is detected by the operation detection unit.

(9)

The information processing device according to any one of (6) to (8), wherein the display control unit makes the guide be displayed at a position of a finger of the user detected by the operation detection unit on the display screen.

(10)

The information processing device according to any one of (4) to (9), wherein the page feed unit continuously feeds the pages when a touch by a first finger of the user to the display screen is detected by the operation detection unit.

(11)

The information processing device according to (10), wherein the page feed unit stops the page feed when a touch by a second finger of the user to the display screen is further detected by the operation detection unit.

(12)

The information processing device according to (11), wherein the page feed unit restarts the page feed when release of the second finger of the user from the display screen is thither detected by the operation detection unit.

(13)

The information processing device according to any one of (1) to (12), wherein the information processing device is a portable device, and wherein the information processing device further includes a display unit configured to display the display screen.

(14)

An information processing method including:

continuously feeding pages in contents including a plurality of pages; and changing the number of the pages to be displayed on a display screen by a processor according to an operation by a user when the pages are fed.

(15)

A program for causing a computer to function as:

a page feed unit configured to continuously feed pages in contents including the plurality of pages; and a display control unit configured to change the number of the pages to be displayed on a display screen according to an operation by a user when the pages are fed by the page feed unit.

What is claimed is:

1. An information processing method comprising:

detecting a touch operation by a user at a first location on a display screen;

continuously feeding pages in contents including a plurality of pages of a document on the display screen according to a sliding operation in which the user continues to touch the display screen for a holding operation after sliding from the first location to a second location on the display screen, wherein the plurality of the pages are displayed on the display screen in units of a number of consecutive pages, and the consecutive pages of the plurality of the pages in a first unit are different from each of the consecutive pages of the plurality of the pages in a second unit having the same number of the pages as the first unit after continuously feeding the pages based on the holding operation;

displaying a guide for the user at a current location of the sliding operation or the holding operation on the display screen to specify the number of pages of the plurality of pages to be displayed on the display screen; and changing the number of the consecutive pages to be displayed on the display screen by a processor according to a selecting operation by the user performed with respect to the displayed guide, wherein the current location of the sliding operation dynamically follows the sliding operation such that the guide specifying the number of the consecutive pages to be displayed is moved in order to be displayed at each point where the user touches the display screen while sliding from the first location to the second location.

2. An information processing device comprising: circuitry configured to detect a touch operation by a user at a first location on a display screen of the information processing device, continuously feed pages in contents including a plurality of pages of a document on the display screen according to a sliding operation in which the user continues to touch the display screen for a holding operation after sliding from the first location to a second location on the display screen, wherein the plurality of the pages are displayed on the display screen in units of a number of consecutive pages, and the consecutive pages of the plurality of the pages in a first unit are different from each of the consecutive pages of the plurality of the pages in a second unit having the same number of the pages as the first unit after continuously feed the pages based on the holding operation, display a guide for the user at a current location of the sliding operation or the holding operation on the display screen to specify the number of the consecutive pages of the plurality of pages to be displayed on the display screen, and change the number of the consecutive pages to be displayed on the display screen according to a selecting operation by the user performed with respect to the displayed guide, wherein the current location of the sliding operation dynamically follows the sliding operation such that the guide specifying the number of the consecutive pages to be displayed is moved in order to be displayed at each point where the user touches the display screen while sliding from the first location to the second location.

3. The information processing device according to claim 2, wherein the circuitry is further configured to continuously feed the pages according to the number of the pages to be displayed on the display screen.

4. The information processing device according to claim 2, wherein a speed of feeding the pages is independent of the number of the pages to be displayed on the display screen.

5. The information processing device according to claim 2, wherein the circuitry is further configured to continuously feed the pages when the sliding operation by the user in a first direction is detected.

6. The information processing device according to claim 2, wherein the guide indicates a plurality of candidates for the number of the pages to be displayed on the display screen, wherein the circuitry is further configured to specify the candidate selected by the user among the plurality of candidates for the number of the pages included in the guide, on the basis of a detection result of the selecting operation, and wherein the circuitry is further configured to control the display screen to display the pages in the number specified by the selecting operation.

7. The information processing device according to claim 6, wherein the selecting operation by the user includes an operation that the user slides from the second location to a third location on the display screen, and wherein the circuitry is further configured to specify which candidate is selected by the user among the plurality of candidates for the number of the pages included in the guide, according to a slide amount of the selecting operation of the user in a direction on the display screen, which is different from a direction of the sliding operation.

8. The information processing device according to claim 2, wherein the circuitry is further configured to stop the page feed when a second touch operation by the user is detected on the display screen.

9. The information processing device according to claim 8, wherein the circuitry is further configured to restart the page feed upon release of the second touch operation of the user from the display screen.

10. The information processing device according to claim 2, wherein the information processing device is a portable device, and wherein the information processing device further comprises a display surface upon which the display screen is displayed.

11. A non-transitory computer-readable medium having embodied thereon a program, which when executed by a computer, causes the computer to execute a method, the method comprising:

detecting a touch operation by a user at a first location on a display screen;

continuously feeding pages in contents including a plurality of pages of a document on the display screen according to a sliding operation in which the user continues to touch the display screen for a holding operation after sliding from the first location to a second location on the display screen, wherein the plurality of the pages are displayed on the display screen in units of a number of consecutive pages, the plurality of the consecutive pages in a first unit are different from each of the consecutive pages of the plurality of the pages in a second unit having the same number of the pages as the first unit after continuously feeding the pages based on the holding operation;

displaying a guide for the user at a current location of the sliding operation or the holding operation on the display screen to specify the number of pages of the plurality of the consecutive pages to be displayed on the display screen; and changing the number of the consecutive pages to be displayed on the display screen according to a selecting operation by the user performed with respect to the displayed guide, wherein the current location of the sliding operation dynamically follows the sliding operation such that the guide specifying the number of the consecutive pages to be displayed is moved in order to be displayed at each point where the user touches the display screen while sliding from the first location to the second location.

* * * * *